(12) United States Patent
Chang et al.

(10) Patent No.: US 10,429,991 B2
(45) Date of Patent: Oct. 1, 2019

(54) METHOD AND APPARATUS FOR DETERMINING MISTAKEN APPROACHING OR TOUCHING EVENT

(71) Applicant: EGALAX_EMPIA TECHNOLOGY INC., Taipei (TW)

(72) Inventors: Chin-Fu Chang, Taipei (TW); Shang-Tai Yeh, Taipei (TW); Jen-Yi Sun, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 747 days.

(21) Appl. No.: 14/587,343

(22) Filed: Dec. 31, 2014

(65) Prior Publication Data

US 2015/0331541 A1   Nov. 19, 2015

Related U.S. Application Data

(63) Continuation-in-part of application No. 14/561,192, filed on Dec. 4, 2014, now Pat. No. 9,367,172.

(60) Provisional application No. 61/911,564, filed on Dec. 4, 2013, provisional application No. 61/912,078, filed on Dec. 5, 2013.

(30) Foreign Application Priority Data

May 14, 2014  (TW) .................................. 103117027

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 2203/04108* (2013.01)

(58) Field of Classification Search
CPC ............................... G06F 3/044; G06F 3/0418
See application file for complete search history.

(56) References Cited

U.S. PATENT DOCUMENTS

| | | | |
|---|---|---|---|
| 8,493,356 B2 | 7/2013 | Joharapurkar et al. | |
| 9,256,315 B2 | 2/2016 | Tsai et al. | |
| 2011/0261007 A1 | 10/2011 | Joharapurkar et al. | |
| 2013/0207935 A1* | 8/2013 | Toda | G06F 3/044 345/174 |
| 2013/0265271 A1* | 10/2013 | Hsu | G06F 3/0418 345/174 |

FOREIGN PATENT DOCUMENTS

| | | |
|---|---|---|
| CN | 102262490 | 11/2011 |
| TW | 201203065 | 1/2012 |
| TW | 201248491 | 12/2012 |
| TW | 201342257 | 10/2013 |

* cited by examiner

*Primary Examiner* — Hang Lin
(74) *Attorney, Agent, or Firm* — WPAT, PC

(57) ABSTRACT

The present application provides a method for determining mistaken approaching/touching event, comprising: gathering one or more touch sensitive signal value corresponding to a line piece; calculating a sum of differences of each signal value and a baseline value; and if the sum is less than or equals to zero, determining the line piece is corresponding to a mistaken approaching/touching event.

8 Claims, 21 Drawing Sheets

METHOD AND APPARATUS FOR DETERMINING MISTAKEN APPROACHING OR TOUCHING EVENT

CROSS REFERENCE TO RELATED APPLICATIONS

This application claims domestic priority to U.S. patent application Ser. No. 14/561,192 filed on Dec. 4, 2014, which claims priority under 35 U.S.C 119 to U.S. provisional patent application, 61/911,564, filed on Dec. 4, 2013, U.S. provisional application, filed on 61/912,078, filed on Dec. 5, 2013, and Taiwan patent application, TW103117027, filed on May 14, 2014, the disclosures of which are incorporated herein by reference.

BACKGROUND OF THE INVENTION

1. Field of the Invention

The present invention relates to detecting approaching or touching event on touch screen, and more particularly, to determining mistaken approaching or touching event caused by ghost point or water spot.

2. Description of the Prior Art

Among approaching or touching events detected above touch screen, some of them are mistakenly caused by ghost points or water spots. These mistaken approaching or touching events may lead to error user instructions and unrecoverable consequences. Hence, there are needs for method and apparatus for determining mistaken approaching or touching event in order to prevent unwanted consequences.

From the above it is clear that prior art still has shortcomings. In order to solve these problems, efforts have long been made in vain, while ordinary products and methods offering no appropriate structures and methods. Thus, there is a need in the industry for a novel technique that solves these problems.

SUMMARY OF THE INVENTION

One objective of the present application is to provide a method for determining mistaken approaching/touching event, comprising: gathering one or more touch sensitive signal value corresponding to a line piece; calculating a sum of differences of each signal value and a baseline value; and if the sum is less than or equals to zero, determining the line piece is corresponding to a mistaken approaching/touching event.

One objective of the present application is to provide an apparatus for determining mistaken approaching/touching event. The apparatus is configured to perform the steps above.

The method and apparatus for determining mistaken approaching/touching event provided by the present application can reduce or even prevent mistaken approaching/touching event being reported to a host to generate unwanted command.

The above description is only an outline of the technical schemes of the present invention. Preferred embodiments of the present invention are provided below in conjunction with the attached drawings to enable one with ordinary skill in the art to better understand said and other objectives, features and advantages of the present invention and to make the present invention accordingly.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
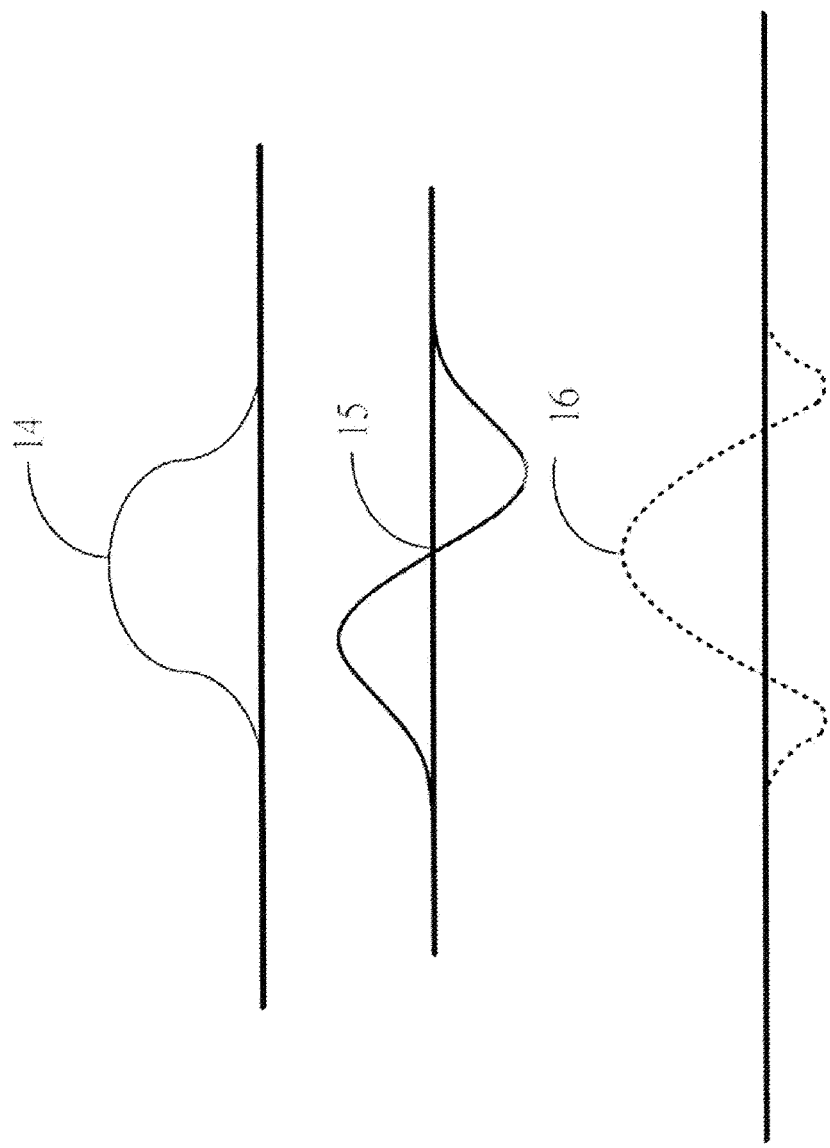
FIG. 1 depicts a diagram of signal values, difference values, and dual difference values in accordance with an embodiment of the present application.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

For convenience, explanations of some terms are provided below. Scope of the present application includes but not limits to the following simple explanations.

Touch Panel/Screen: A sensing layer is formed on a substrate, and its control device is capable of detecting the position of at least one conductive object approaching or touching the substrate using the sensing layer. The sensing layer may be a single-layered or multi-layered structure.

Approaching/Touching: Approaching, approximating or touching.

External Conductive Object: It can be a part of the human body, such as a finger or a palm, or an object in connection with the human body, such as a passive stylus. It can also be an active stylus which emits signals to enable a touch panel to detect the position itself. It can also be a grounded testing conductive object, such as a copper cylinder. It can also be water or conductive liquid retained on the surface of a touch panel.

Approaching/Touching Object: An external conductive object that is approaching or touching a substrate.

Approaching/Touching Event: An event of an external conductive object detected by a touch panel when the external conductive object is approaching or touching a substrate.

Sensing Layer: It includes a plurality of (m) driving electrodes parallel to a first axis and a plurality of (n) sensing electrodes parallel a second axis. The driving electrodes and the sensing electrodes are exposed from one another, forming m times n sensing points. The first axis and the second axis may be perpendicular to each other, and m can equal to n.

Driving Electrode (First Conductive Strip): A plurality of (m) electrodes which are parallel to the first axis are used to transmit driving signals. They can be made of transparent or opaque material such as Indium Tin Oxide (ITO) or carbon nanotubes. It can be a single-layered or multi-layered structure.

Sensing Electrode (Second Conductive Strip): Electrodes used for detecting capacitive signals. It can be made of transparent or opaque material such as Indium Tin Oxide (ITO) or carbon nanotubes. It can be a single-layered or multi-layered structure.

One-dimensional Sensing Information: A plurality of sensing information corresponding to a first axis or a second axis. It may indicate a collection of signal values of m sensing points of m driving electrodes corresponding to a single sensing electrode. It may also indicate a collection of signal values of n sensing points of n sensing electrodes corresponding to a single driving electrode. In other words, one-dimensional sensing information may include signal values of m sensing points, or signal values of n sensing points. One-dimensional sensing information may also include single difference values or dual difference values of m/n sensing points.

Two-dimensional Sensing Information: Sensing information formed by combining a plurality of one-dimensional sensing information. It can also be called an image.

Baseline or Stray: A signal value corresponding to a specific working frequency.

Signal Value: It can be a signal directly detected by a sensing electrode or a signal value restored from a single difference value or a dual difference value, although these two value may not be the same, they are interchangeable in some embodiments.

Single Difference Value (or simply Difference): The difference in signals values between adjacent sensing points.

Dual Difference Value: The difference between adjacent difference values.

Line Piece: All or a continuous part of one-dimensional sensing information.

Line Piece Group: A plurality of line pieces corresponding to adjacent one-dimensional sensing information, and there is at least one pair of neighboring sensing points on adjacent axes.

Ghost Point: A point or region corresponding to an unwanted capacitive sensing.

There are three processes in the operations of a touch panel/screen. One is a full screen driving detection process, in which the existence of at least one approaching/touching object can be determined by simultaneously providing driving signals to all of the driving electrodes. The second one is an external noise detection process, in which the supplying of driving signals to all of the driving electrodes is stopped to determine if an external electromagnetic interference is severe. The third one is a touch point reporting process, in which driving signal is sequentially provided to each of the driving electrodes, and then touch points and/or related information are reported to other software or hardware based on signal values detected or read by each of the sensing electrodes.

In an embodiment, the order in which the above three processes are executed is that the full screen driving detection process is first executed to make sure there is no external conductive object on the touch panel/screen, then the external noise detection process is executed to make sure the external electromagnetic interference is not severe or to set a new working frequency of driving signal, and finally the touch point reporting process is executed.

In one embodiment, after the touch point reporting process, the above processes are iterated.

In another embodiment, after several iterations of the touch point reporting process are performed, the external noise detection process is executed once, and then several iterations of the touch point reporting process are again followed by one external noise detection process. After the external noise detection process is performed several times, the full screen driving detection process is then executed.

One with ordinary skill in the art can appreciate that there are infinite number of combinations of the executions of the above three processes, and the present invention is not limited to a particular combination. The order of executions can be determined in advance, or can be altered on the fly depending on the situations encountered, or the execution of a specific process is decided on the fly.

In general, the objectives of the touch point reporting process are to detect a pen touch and/or a fingertip approaching/touching the touch panel/screen, and to eliminate palms and water (a combinational representation of conductive liquid, referred to as water hereinafter) or unwanted capacitive sensing. The touch point reporting process may further include and be divided into the following steps: scanning or detecting all sensing points; making adjustment based on the electrical characteristics of the sensing electrodes and the curvature of the substrate; determining at least one line piece corresponding to each of the above objects; examining every line piece to eliminate water and ghost points; combining eligible line piece(s) into a line piece group to eliminate palms; positioning a pen touch and/or fingertip(s); tracking positions or tracing; and reporting the position(s). Although the touch point reporting process can include every one of the above steps, but not every step is necessary, and some may be bypassed.

In general, a processing module of a touch panel/screen can obtain m lines of one-dimensional (1D) sensing information detected by every sensing electrode. Each line of 1D sensing information includes n pieces of information corresponding to the sensing points of respective driving electrodes. The processing module may obtain signal values directly, or obtain difference values directly. When signal values are obtained, difference values of these signal values can be calculated. When difference values are obtained, signal values can be derived through the baseline. Then, dual difference values can be further calculated regardless whether 1D sensing information of signal values or difference values are obtained.

Referring to FIG. 1, the topmost curve 14 indicates signal values; the middle curve 15 indicates difference values; and the bottommost curve 16 indicates dual difference values.

In optional steps, owing to the electrical characteristics of the sensing electrodes, signal value detected by each sensing point may have some deviations that can be adjusted. In addition, since the substrate may be bent as a result of an approaching/touching event, the substrate itself may be deformed. Thus, the effect of the deformation of the substrate can also be adjusted.

The step of determining a line piece using an 1D sensing information can include finding the range of the line piece using dual difference values, difference values and/or signal values. Once the dual difference values are obtained, there are several ways to extract the line pieces.

In one embodiment, a "relative high point" higher than a dual difference threshold can be first determined. Then, a "relative low point" is found retrospectively (which is called a first point or a preceding point), and another "relative low point" is found prospectively (which is called a second point or a following point); the range of this line piece is from the first point to the second point. For example, there are 1D sensing information of n sensing points. A relative high point is found at the $20^{th}$ point, a relative low point found retrospectively is at the $15^{th}$ point, and another relative low point found retrospectively is at the $25^{th}$ point; the range of this line piece is from the $15^{th}$ point to the $25^{th}$ point, and the length of the line piece is 11.

However, in some examples, a relative low point cannot be found retrospectively or prospectively within a certain range. When this happens, a certain retrospective or prospective distance is defined as the range of the line piece. For example, the above distance is set to 5. Thus, when a relative low point cannot be found prospectively from a relative high point (e.g. the $20^{th}$ point), then the $25^{th}$ point is defined as the second point, and the range of the line piece is from the $15^{th}$ point to the $25^{th}$ point, and the length of the line piece is 11, and vice versa.

The above embodiment is suitable for extracting a line piece having a value higher than the dual difference threshold. However, some approaching/touching events may occur without generating a single dual difference value that is higher than the dual difference threshold, instead a flatter curve of dual difference values is generated. For example, when the tip of a slim stylus or pencil touches the panel, a single dual difference value that is higher than the dual difference threshold will not be generated. Therefore, if such a type of approaching/touch object is to be detected, then the following method for extracting a line piece can be adopted.

First, two contiguous positive dual difference values are found and added together to compare with the dual difference threshold. If the sum is higher than the dual difference threshold, these are the relative high points. Then, similarly, a relative low point (called a first or preceding point) is found retrospectively. After that, a relative low point (called a second or following point) is found prospectively. The range of this line piece is from the first point to the second point. Similarly, when a relative low point cannot be found retro- or prospectively, then a certain retrospective or prospective distance is defined as the range of the line piece.

For example, assuming the dual difference threshold is 5, and a series of dual difference values is [0, 0, 0, −1, −3, −1, 1, 3, 3, 1, −1, −3, −1, 0, 0, 0]. In the above series, the first two positive dual difference values are 1 and 3, but their sum is less than the dual difference threshold. Next, two contiguous 3s are found prospectively. Since their sum is 6, which is greater than the dual difference threshold, these two values are regarded as the relative high points. Then, the first point and the second point are found retrospectively and prospectively.

It should be noted that the second method that compares the sum of two positive dual difference values with the threshold is also applicable to the scenario where there is only a single value that is greater than the threshold.

Once all line pieces on the touch panel/screen are found, then the line pieces are examined. The examination of the line pieces may be used to eliminate water and ghost points. Herein, a combination of dual difference values, difference value and/or signal values can be used for examination.

Figure 2:
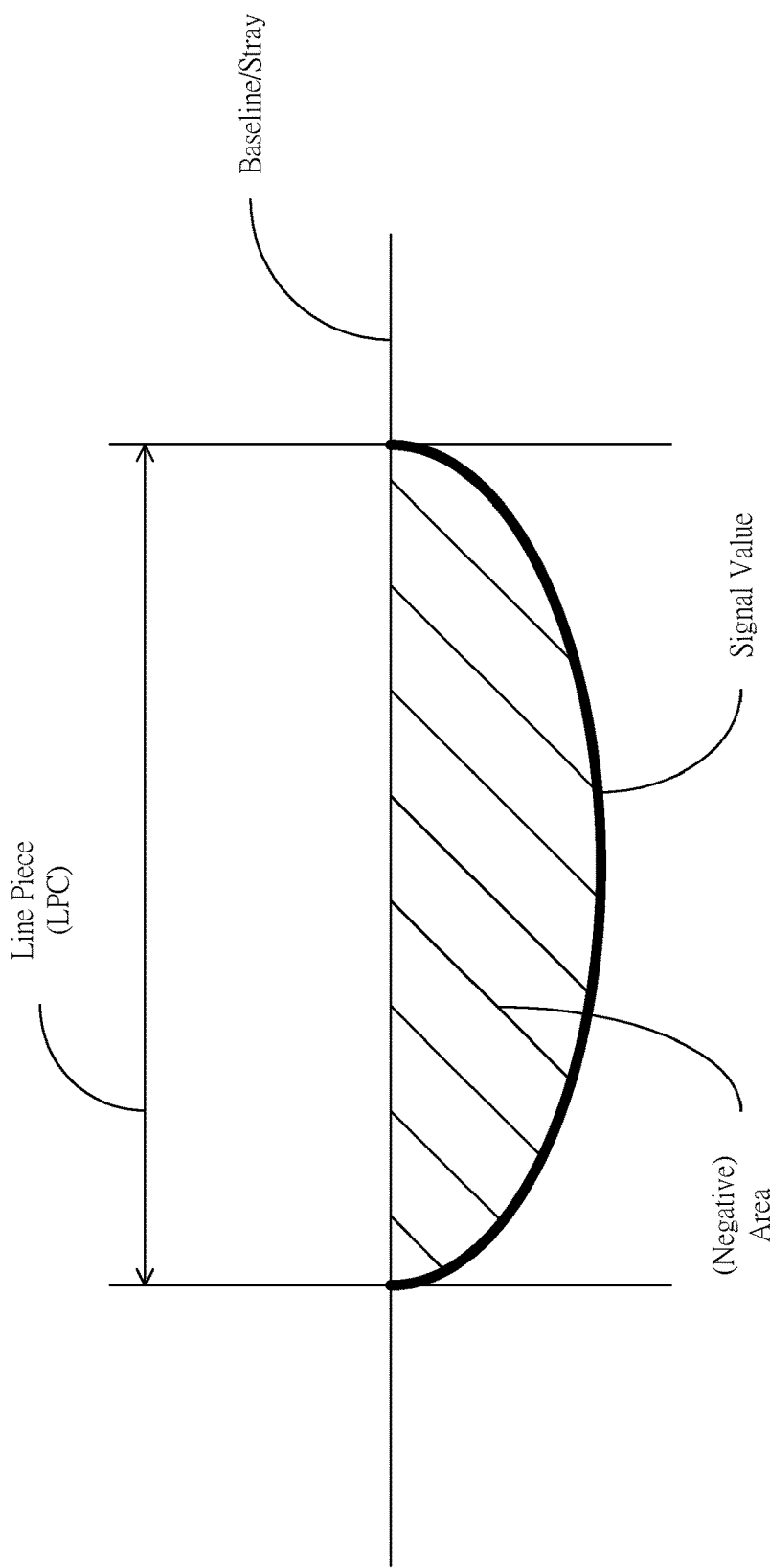
FIG. 2 depicts a diagram of an area enclosed by signal values and baseline values in accordance with an embodiment of the present application.

When a line piece is found by using the dual difference values, the corresponding difference values and signal values of this line piece are then known. The area between the signal values and the baseline can be calculated. As shown in FIG. 2, when the area is below the baseline, it is called a negative. A negative area is usually caused by water or a ghost point. When the area of the signal values of the line piece is negative, then this line piece can be disregarded or ignored.

Figure 3:
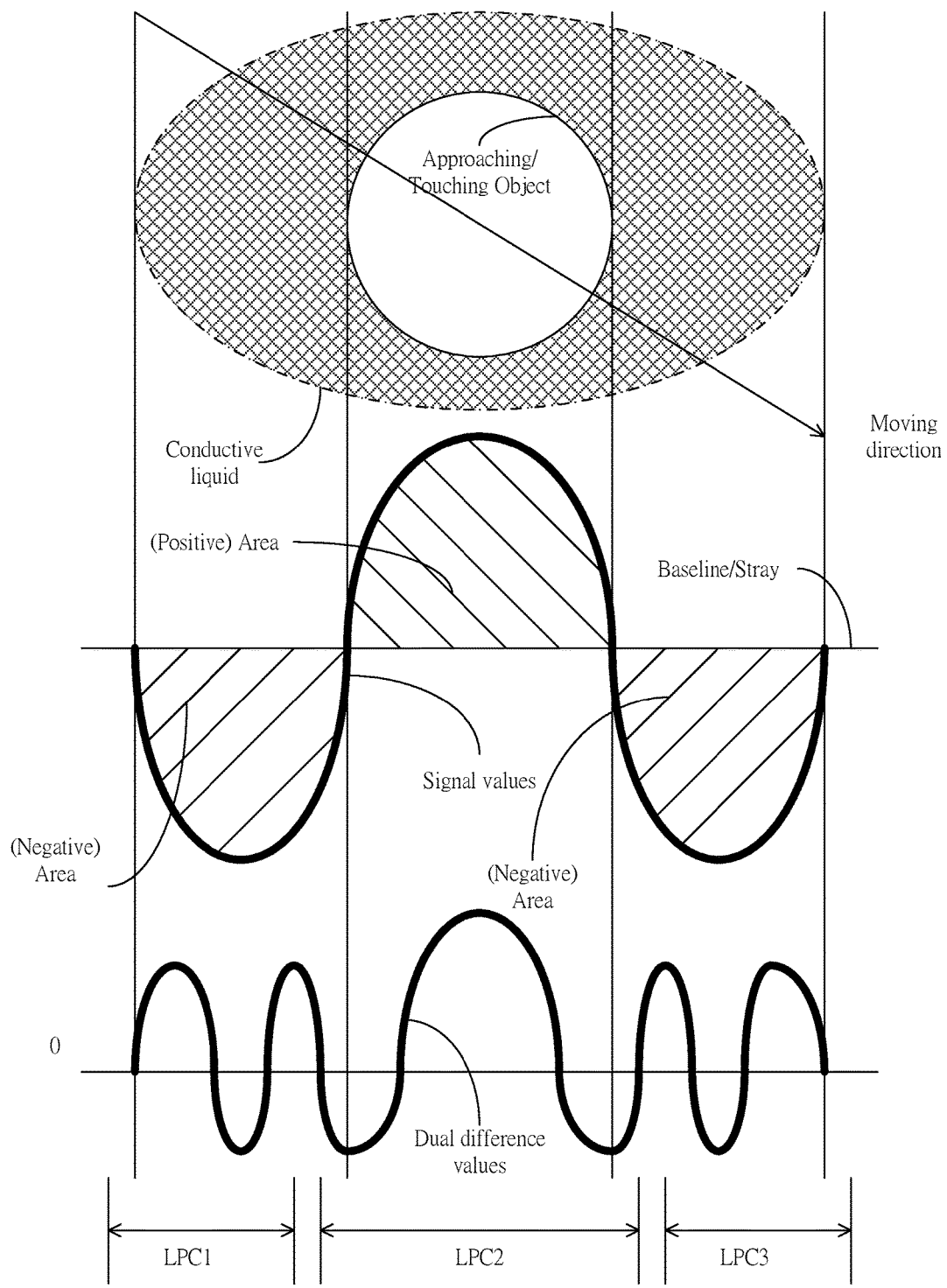
FIG. 3 depicts a diagram of signal values, dual difference values, and line pieces when a finger slides over conductive liquer in accordance with an embodiment of the present application.

Referring now to FIG. 3, under certain circumstances, there is a big patch of water on the touch panel, when a fingertip crosses this patch of water, it can still be detected. Based on the above methods for finding a line piece, three line pieces are segmented from the dual difference values; from left to right, they are LPC1, LPC2, and LPC3, respectively.

When signal value are restored from these three line pieces, it can be seen that the area corresponding to LPC1 is negative, and so as the area corresponding to LPC3. Only the area corresponding to the LPC2 is positive. Therefore, at this stage, LPC1 and LPC3 are discarded or ignored, leaving with only LPC2.

Figure 4:
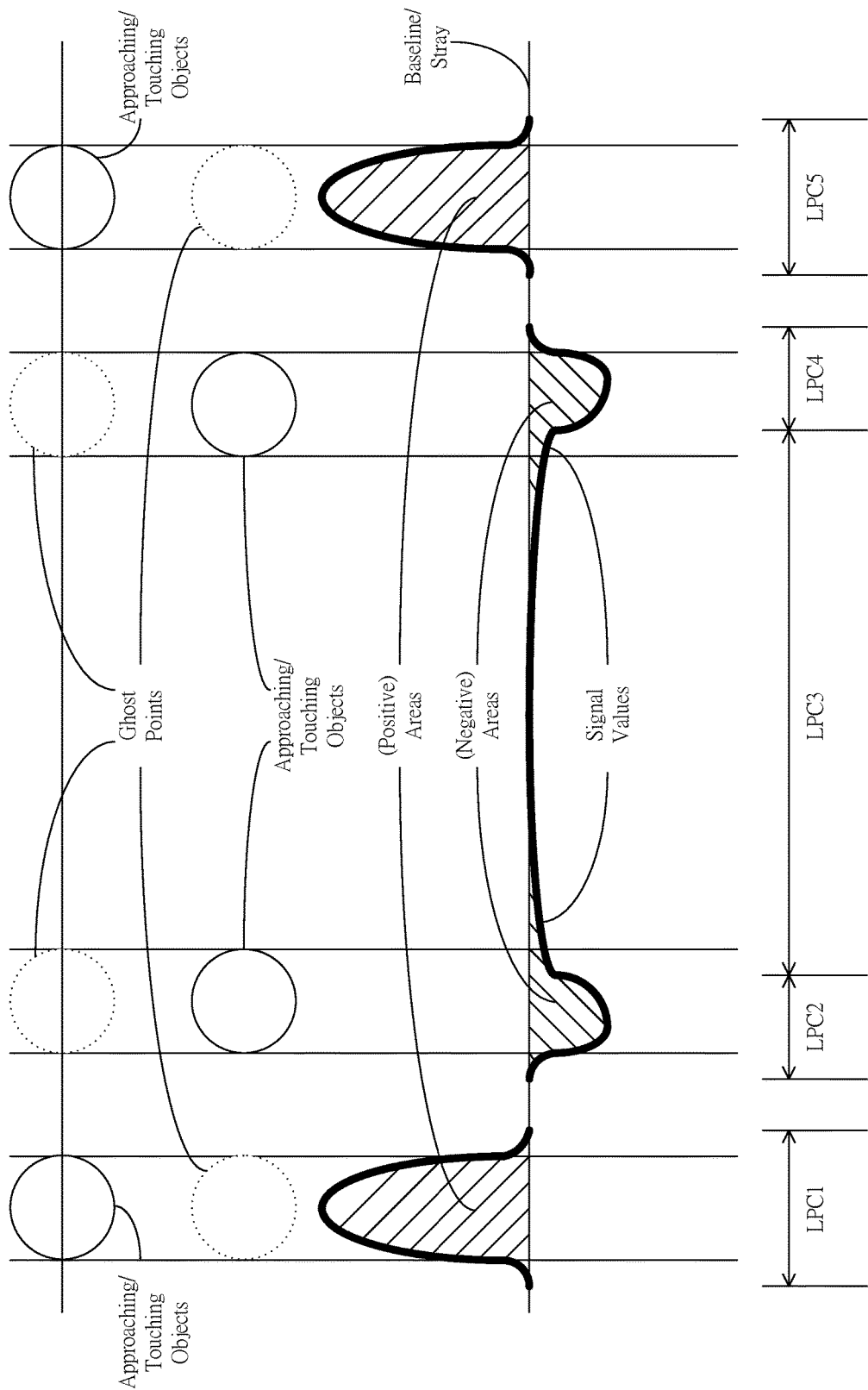
FIG. 4 depicts a diagram of signal values and line pieces when ghost points caused by multiple fingers in accordance with an embodiment of the present application.

Referring to FIG. 4, under some circumstances, ghost points may be generated. For example, there are four approaching/touching events occurring simultaneously in the touch area. Since current will flow from one approaching/touching event to the other approaching/touching event, such as from one finger to another finger of the same palm, and then back to a sensing electrode, a ghost point will be generated. These ghost points will be detected in the dual difference values, wherein two approaching/touching events and two ghost points belong to the same axis.

In the step of line piece extraction, apart from LPC1 and LPC5 corresponding to two respective approaching/touching events, there are two other line pieces LPC2 and LPC4 corresponding to two ghost points. However, between the two ghost points, another line piece LPC3 is detected. When determining the area of the signal value of each line piece, it is found that the areas of the signal values of the line pieces LPC1 and LPC5 are positive, while the rest (LPC2, LPC3 and LPC4) are negative. Therefore, LPC2, LPC3 and LPC4 can be discarded or ignored, leaving only LPC1 and LPC5.

Figure 5A:
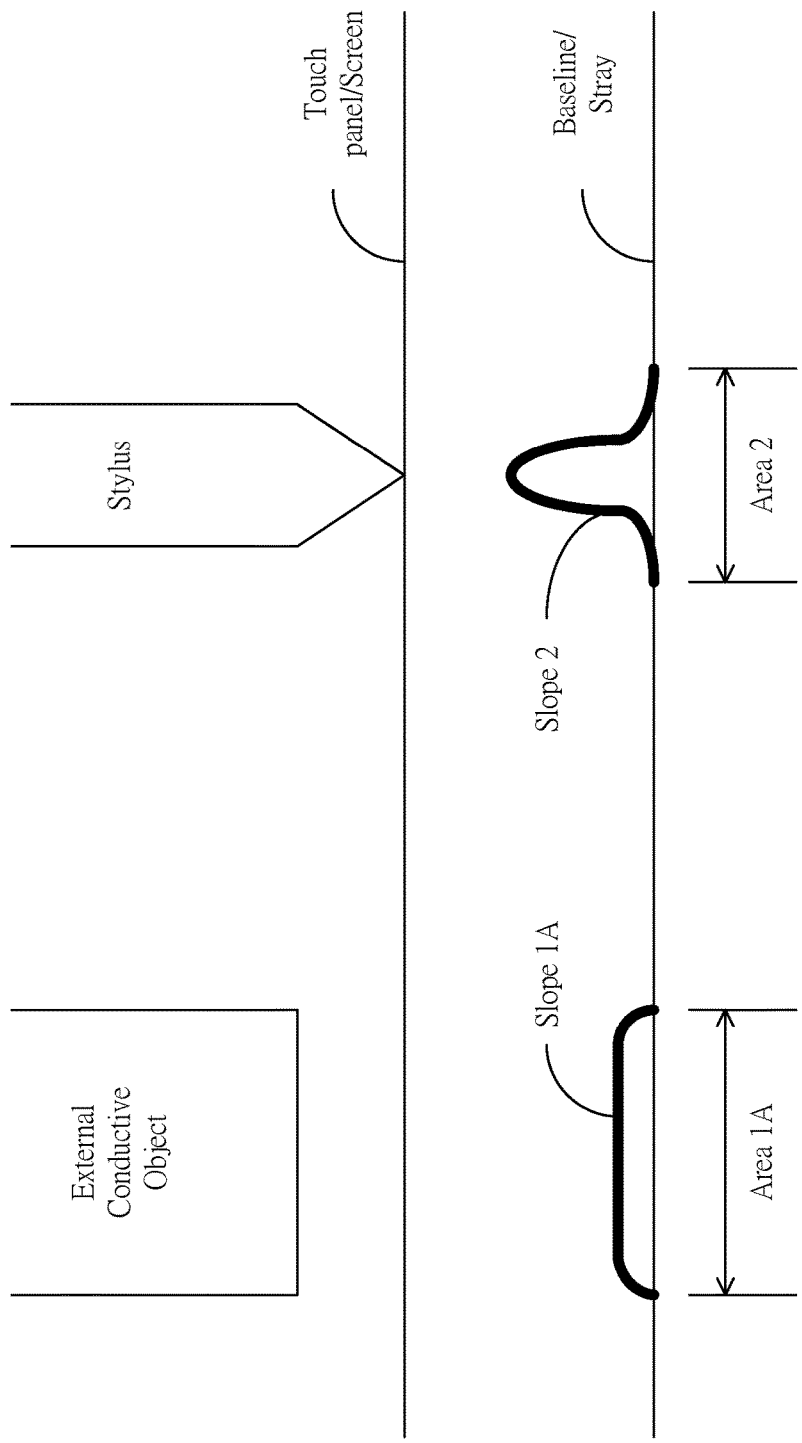
FIG. 5A depicts a diagram of signal values caused by stylus tip and large conductive object in accordance with an embodiment of the present application.

Referring to FIG. 5A, under some circumstances, there may be unwanted approaching/touching events. On the right-hand side of the diagram, it shows the touch of the tip of a pen, which has a very small touch area and the amount of signal variation it causes is not significant. On the left-hand side of the diagram, it shows a large conductive object, for example, a copper rod with a very good conductivity coefficient. When the copper rod is still some distance away from the touch panel/screen, it has already started to influence the sensing electrode. These two approaching/touching events will be found during line piece extraction, but the touch panel should not report a touch point for the approaching/touching event on the left-hand side of the diagram.

Thus, when examining their signal values, the slopes of the line pieces at the edges as well as the areas, which may be represented by the length, of the line pieces can be examined. The area of the tip of the pen (Area 2) is smaller, but the slope of the edge of this line piece (Slope 2) is larger. The area of the left-hand side approaching/touching event (Area 1A) is larger, but the slope of the edge of this line piece (Slope 1A) is smaller. Therefore, the line piece corresponding to the left-hand side approaching/touching event can be removed using both the slope and the area to filter out the unwanted approaching/touching event.

Figure 5B:
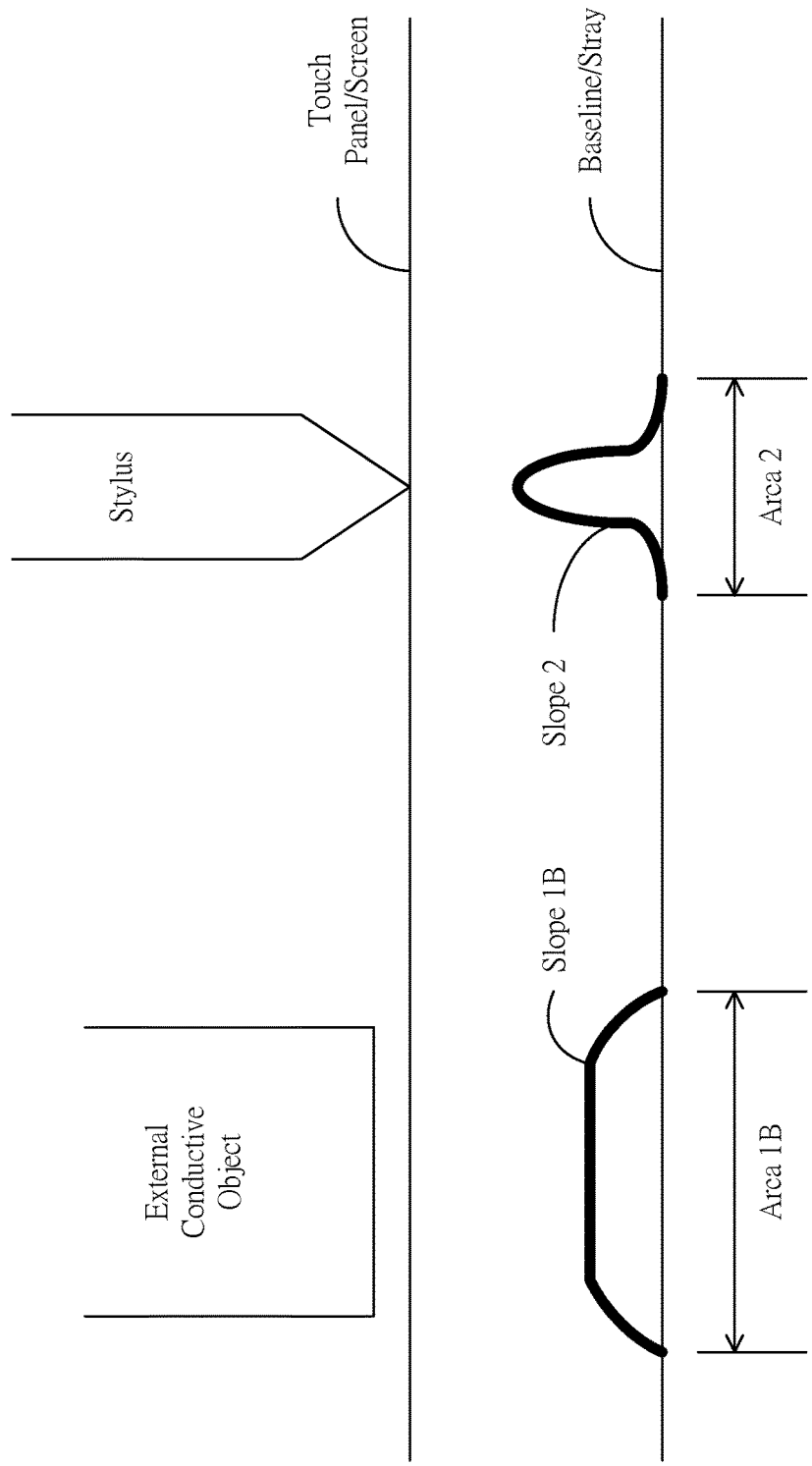
FIG. 5B depicts a diagram of signal values caused by stylus tip and large conductive object in accordance with an embodiment of the present application.

Referring now to FIG. 5B, comparing with FIG. 5A, the external conductive object gets closer to the touch panel. Similarly, the left approaching/touching event needs to be eliminated by the touch panel. Thus, by using the same examination described in FIG. 5A, the slopes at the edges as well as the areas, which may be represented by the length, of the line pieces are examined. The area of the stylus tip (Area 2) is smaller, but the slope of the edge of this line piece (Slope 2) is larger. The area of the left-hand side approaching/touching event (Area 1B) is larger, but the slope of the edge of this line piece (Slope 1B) is smaller. Although the area 1B and the signal values shown in FIG. 5B is larger than the area 1A and the signal values shown in FIG. 5A, the slopes (Slope 1A and Slope 1B) at the edges of the line pieces are smaller than the slope (Slope 2) of the line piece caused by the stylus tip. Thus, by examining the slope and the area, undesired approaching/touching event are eliminated by discarding the line piece corresponding to the left approaching/touching event.

Figure 5C:
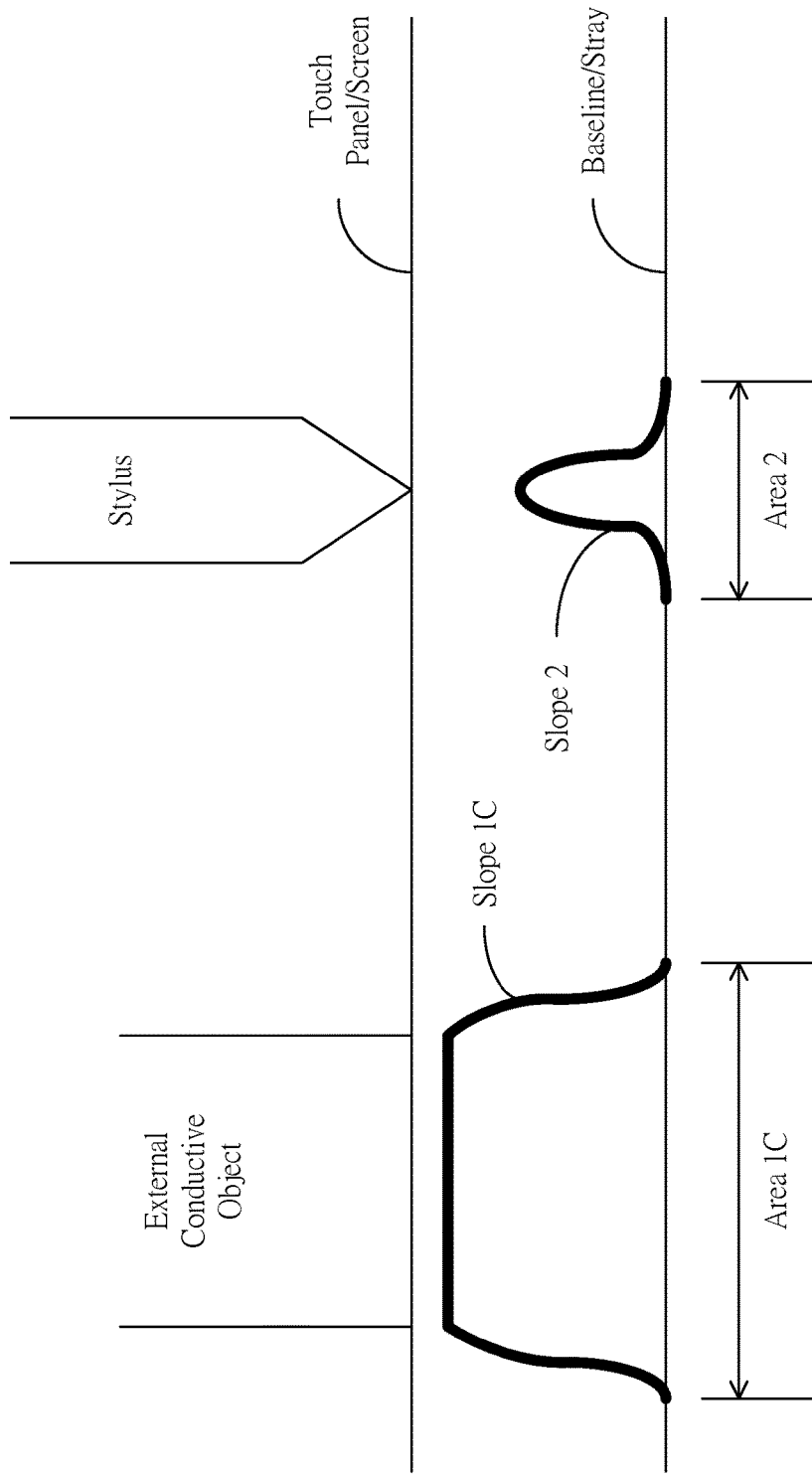
FIG. 5C depicts a diagram of signal values caused by stylus tip and large conductive object in accordance with an embodiment of the present application.

Referring now to FIG. 5C, comparing with FIGS. 5A and 5B, the external conductive object already contacts the touch panel. Therefore the signal values corresponding to the conductive object is larger than the signal values corresponding to the stylus tip. Hence, the slope (Slope 1C) at the edges of the corresponding line piece is larger than the slopes (Slope 1A and Slope 1B) at the edges of the corresponding line pieces. Besides, the area (Area 1C) is also larger than the areas (Area 1A and Area 1B). Thus, although the left approaching/touching events shown in FIGS. 5A and 5B are eliminated, the left event shown in FIG. 5C would not be discarded by examining the slope and the area.

After all line pieces are examined, and after some line pieces resulting from water, ghost points or unwanted approaching/touching events are discarded or ignored, the line pieces are grouped into line piece groups in order to find the centroids of the approaching/touching events, and remove the portion(s) touched by one or more palms.

Figure 6:
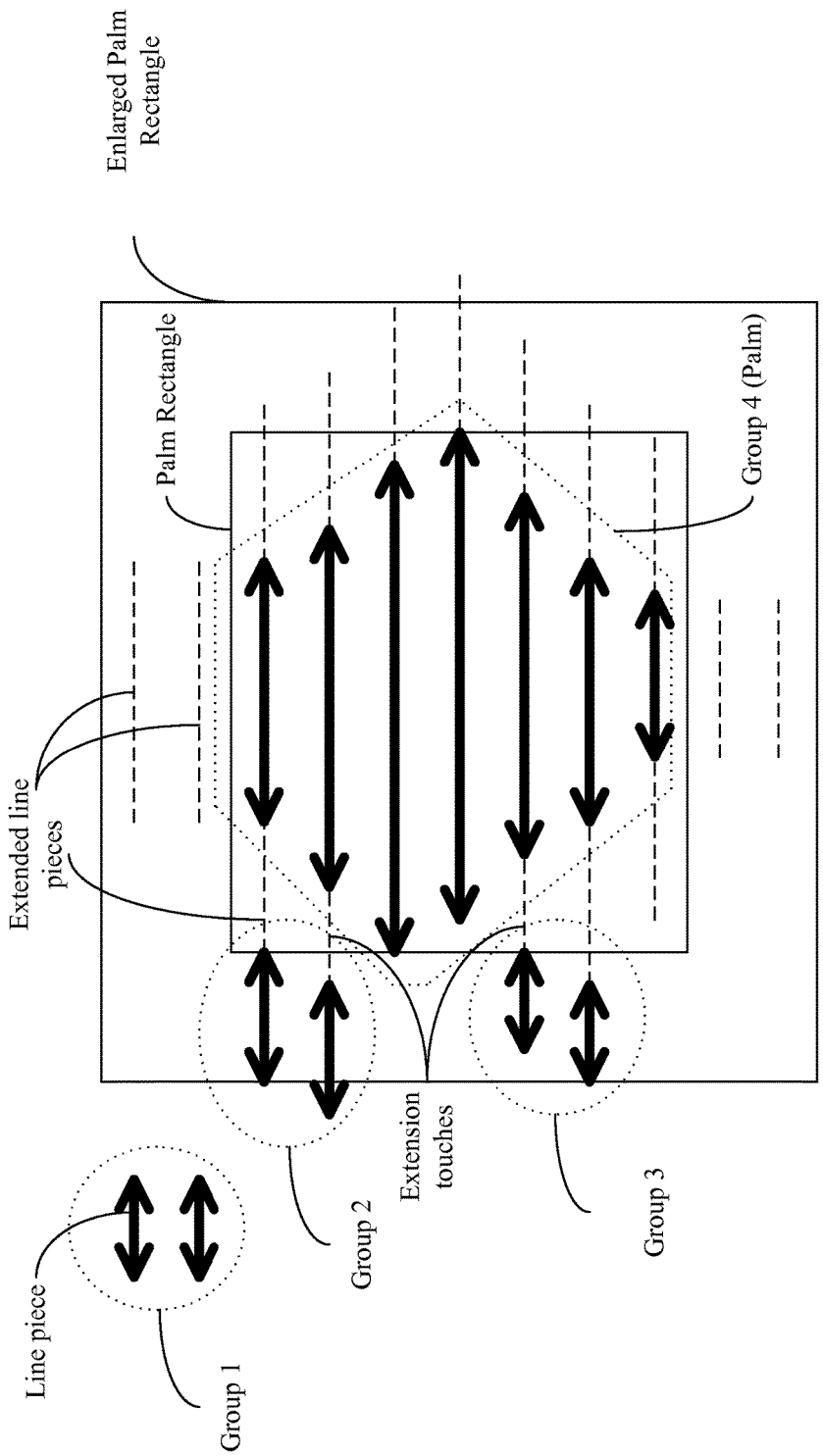
FIG. 6 depicts a diagram of determining palm area by line piece groups in accordance with an embodiment of the present application.

Referring to FIG. 6, after all the line pieces are found, line pieces that are adjacent to each other in the vertical direction are grouped into one line piece group. In FIG. 6, there are four line piece groups, wherein Group 4 is an approaching/touching event caused by a palm. Group 2 and Group 3 are approaching/touching events caused by touches of fingers that are not intended to operate on the touch panel, so they should be considered as part of the palm. Only Group 1 is a real approaching/touching event caused by a fingertip or the tip of a pen that is operating on the touch panel. In other words, the touch panel/screen should classify Group 2, Group 3 and Group 4 as part of the palm, and only report a touch point for Group 1.

In an embodiment, a line piece is considered as part of the palm if it satisfies one or a combination of the following conditions. Condition One: when a signal value of a line piece in a line piece group is higher than a palm signal threshold. Condition Two: when the length of a line piece in a line piece group is larger than a palm length threshold. Condition Three: when the number of line pieces in a line piece group is larger than a palm line piece quantity threshold. The palm length threshold may or may not be equal to the palm line piece quantity threshold.

As long as one line piece group is classified as a palm line piece group, a step of combining other line piece groups can be performed. In FIG. 6, every line piece in Group 4 can be extended in both the horizontal and vertical directions. After extending a certain amount of horizontal distance, if another line piece group is met, then the touched line piece group is also considered as part of the palm line piece group. For example, Group 2 and Group 3 are both included in the horizontal extension range of Group 4, so these line piece groups are classified as the palm line piece group. However, Group 1 is obviously too far from Group 4 to be included by the extension of Group 4, so Group 1 will not classified as part of the palm line piece group.

In terms of the vertical direction, the fringe line pieces are extended upwards and downwards; the length of an extended line piece and the length of a fringe line piece can be the same or in proportional to each other. For example, the length of a first extended line piece can be 80% of the length of a fringe line piece. The length of a second extended line piece can be 80% of the length of the first extended line piece, and so on until the number of the extended line pieces has reached an upper limit, or the length of the extended line piece is less than a lower limit. In FIG. 6, none of the vertically extended line pieces in Group 4 touches other line piece groups.

It should be noted that the above extension can be limited to once only. That is, the extension is only done on Group 4 that is originally thought as a palm, and not on Group 2 and Group 3. However, the present invention can also include further extensions on extended line piece groups, but their horizontal distances may be shorter than the original horizontal extension distance, and their numbers and proportions of vertical extensions may be less than the originally extension number or proportion. In another embodiment, the conditions for further extension can be the same as the original extension.

In another embodiment, a palm rectangle can be drawn from the original palm line piece group. An enlarged palm rectangle can be further drawn in accordance with the above extension spirit. If another line piece group becomes overlapped with the enlarged palm rectangle, it will be treated as the palm line piece group.

The calculations for the method of the enlarged palm rectangle are simpler than the previous method, but it may include more areas. If an approaching/touching event to be reported as a touch point is in the range of the enlarged palm rectangle, its corresponding line piece group is usually ignored. Thus, in the case where computational resources are not a concern, the previous extension method is better.

During handwriting, since the palm and the fingertip keeps moving, their touch areas may change rapidly. Sometimes, the portion touched by a palm may be divided into many separate smaller regions and cannot be detected as a palm. Thus, when a palm line piece group is being detected by a detection scan, a palm flag and/or a timestamp can be set.

During the period in which the palm flag is set, three of the above conditions can be relaxed. For example, the palm signal threshold can be reduced; the palm length threshold can be shortened; and the palm line piece quantity threshold can be reduced. As a result, there is a higher probability of determining a line piece as a palm line piece group. In an embodiment, the above relaxed region can be limited to be within an enlarged palm rectangle or an enlarged palm shape. Only when the enlarged palm rectangle or shape overlaps with a line piece group, the three conditions are relaxed. When no palm line piece group is detected, the timestamp can be checked to see if it is expired. When the timestamp has already exceeded a threshold, the palm flag can be cleared.

The present invention is not limited to the above method for setting the palm flag and/or timestamp. As long as a palm is being determined, the conditions for determining as a palm can be relaxed.

Figure 7:
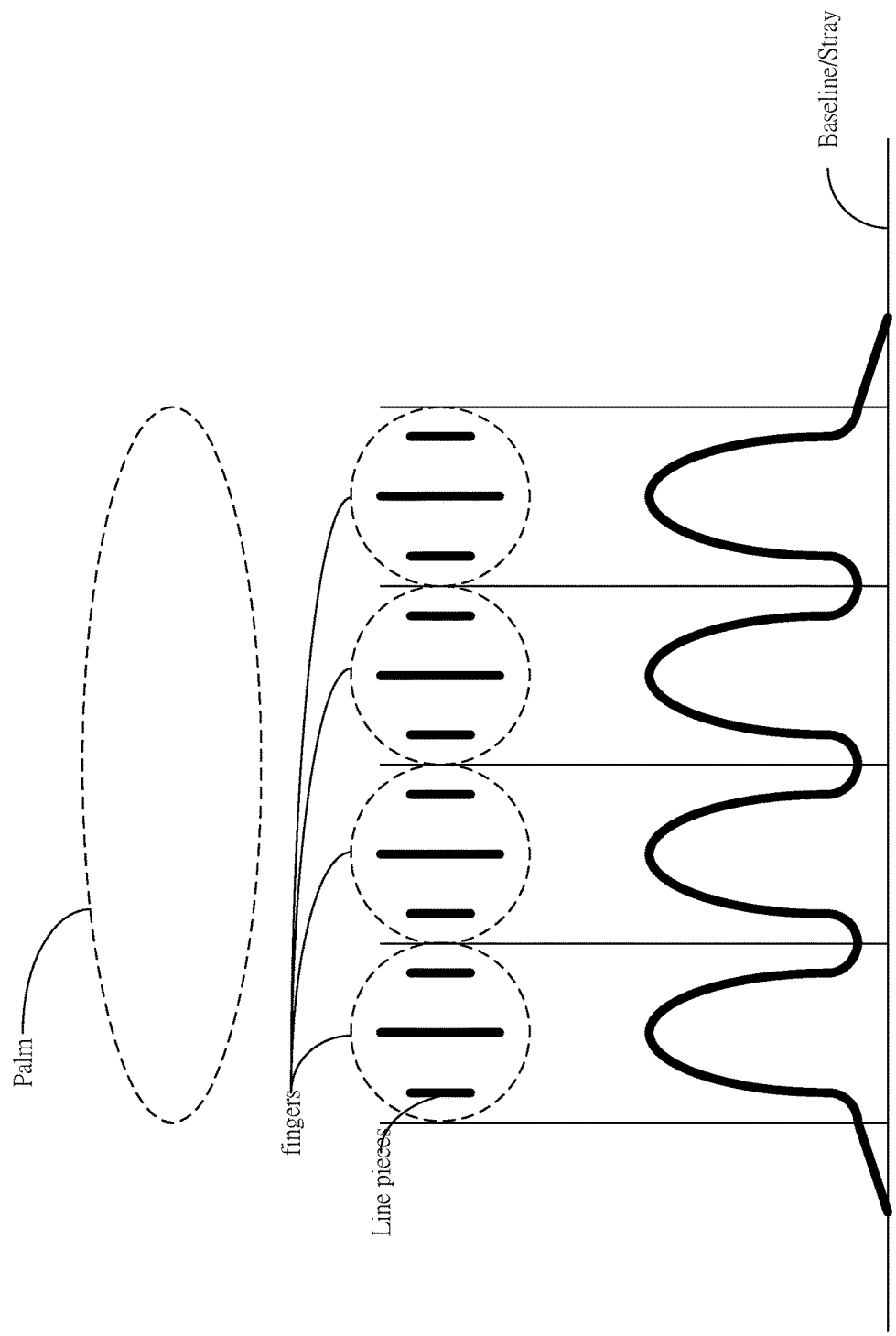
FIG. 7 depicts a diagram of preventing mistaking multiple fingers as a palm in accordance with an embodiment of the present application.

In some circumstances, an approaching/touching event is very close, so it requires a special method for dismantling a line piece group. Referring to FIG. 7, when four fingers are used at the same time, according to the above three conditions, the line pieces corresponding to these four fingertips will be combined into one line piece group. Since the number of line pieces in this line piece group is greater than the palm line piece quantity threshold, so they will be considered as a palm line piece group and thus discarded.

In order to prevent this from happening, the palm line piece group is analyzed. When its total area (i.e. the total length of the line pieces) is smaller than its corresponding normal palm area, then a dismantling step is performed. Alternatively, when the length of each line piece in the palm line piece group varies between long and short, the dismantling step can also be performed. During dismantling, it can be seen that the signal values between each fingertip are very small, so it can be dismantled into four line piece groups; each corresponds to a fingertip. Since the original line piece group is broken down into four line pieces, it will no longer be considered as a palm line piece group. Therefore, the approaching/touching events corresponding to the four line piece groups will be reported as touch points.

Another scenario that requires special treatment is the line piece group for the tip of a pen. In some embodiments, for example, when the spacing between sensing electrodes is approximately 4 mm, and the diameter of the tip of the pen is about 1.5-2 mm, there are only two possibility for the corresponding line piece(s). There is a higher probability that it will correspond to a single short line piece, and there is a lower probability that it will correspond to a line piece group composed of two adjacent line piece that are about the same length, but their lengths are relatively short as well.

Thus, when a single line piece is detected, it is determined whether it is the tip of a pen. It has already been mentioned earlier that a condition for determining the tip of a pen may include determining the slope of the signal value of the line piece at the edge. When the tip of a pen is determined, a corresponding pen tip flag and/or a timestamp of the pen tip can then be set.

Assuming in the next scanning detection, a pen tip having a line piece group with similar characteristics is detected, it is determined whether the above pen tip flag has been set. If so, then the line piece group is determined to be a pen tip, and must be reported as a touch point. Otherwise, this line piece group is ignored. Since when a pen tip first approaches/touches a touch panel/screen, there is only a lower probability that it will appear as a line piece group. Once it starts moving, the appearance of a single line piece is almost guaranteed, so it will not affect the experience of the user much.

The timestamp can be used for comparison. After the trace of the tip of the pen has disappeared for a period of time, then the pen tip flag can be cleared. It should be noted that if a plurality of pen tips are allowed to approach/touch the touch panel/screen at the same time, then the above pen tip flag will need to correspond to the trace of a particular pen tip.

After the touch point reporting process, positioning is performed based on the line piece groups; positions are tracked or traced; and the positions are reported.

Figure 8:
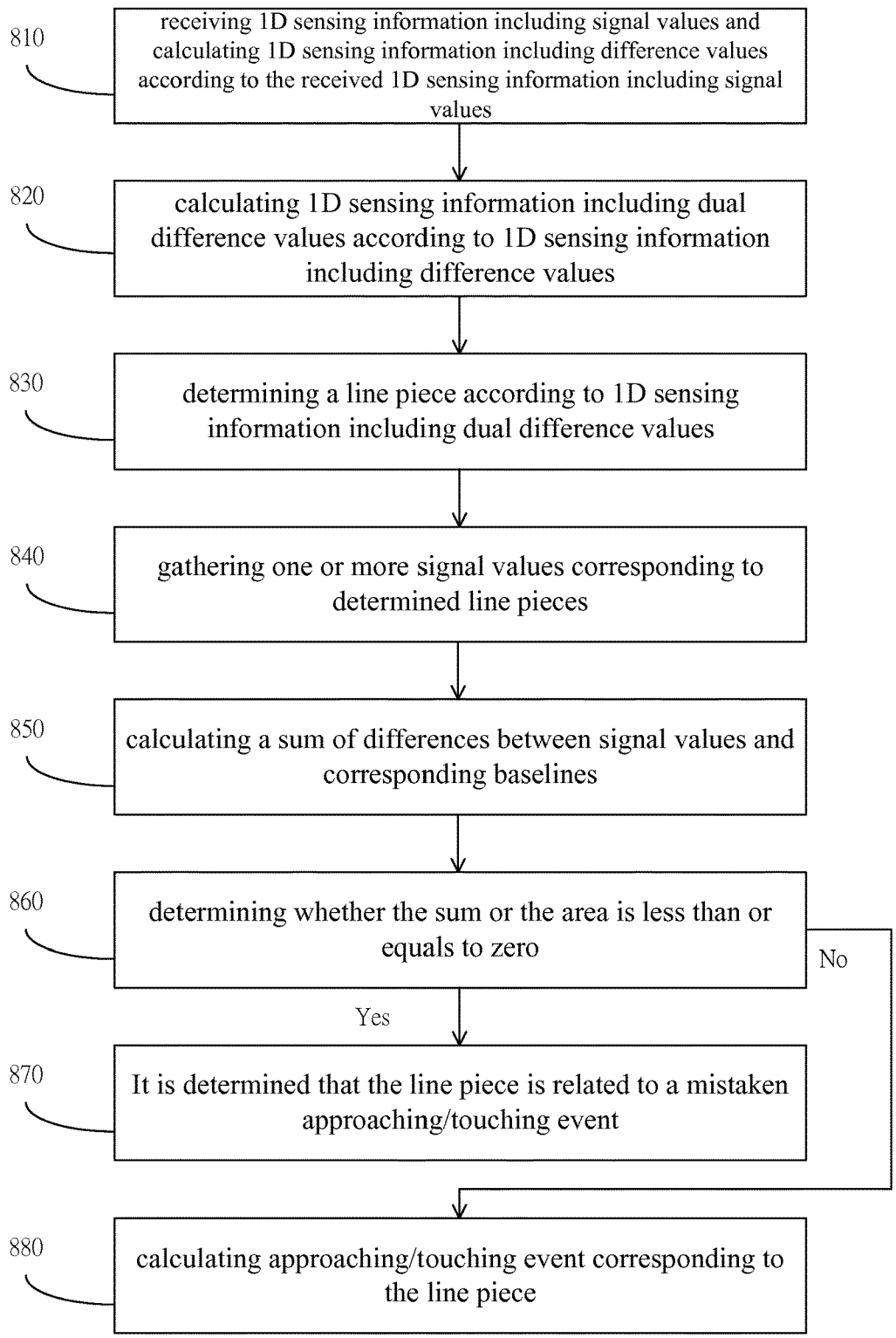
FIG. 8 depicts a flowchart diagram of determining mistaken approaching/touching event in accordance with an embodiment of the present application.

Please refer to FIG. 8, which illustrates a flowchart diagram of method for determining mistaken approaching/touching event in accordance with an embodiment of the present invention. As shown in FIG. 8, except for those consequential steps, the present invention does not limit the execution order of the steps. And additional step could be inserted into two steps. Besides, embodiments shown in FIGS. 2-4 are incorporated into references.

In one embodiment, the flow may begin at step 810, receiving 1D sensing information including signal values and calculating 1D sensing information including difference values according to the received 1D sensing information including signal values. Next, step 820 is performed.

In another embodiment, the flow may begin at step 820, calculating 1D sensing information including dual difference values according to 1D sensing information including difference values. Next, step 830 is performed.

In an alternative embodiment, the flow may begin at step 830, determining a line piece according to 1D sensing information including dual difference values. Next, step 840 is performed. The paragraphs above already mentioned how to determine line piece, thus no further description is elaborated.

It is worth noted that chip or apparatus embodying the method embodiment shown in FIG. 8 may receive signal values, difference values and/or dual difference values while receiving 1D sensing information. The present invention does not limit to receive a specific type of value as long as line pieces could be determined accordingly.

Step 840 is performed for gathering one or more signal values corresponding to determined line pieces. As indicated above, the present invention does not limit to receive a specific type of value. However, in step 840, signal values corresponding to determined line pieces have to be acquired. For example, if dual difference values are received by chip or apparatus realizing the method embodiment shown in FIG. 8, corresponding difference values could be calculated first, then corresponding signal values could be calculated in consequence. In case difference values are received by chip or apparatus practicing the method embodiment shown in FIG. 8, corresponding signal values could be calculated accordingly. If what chip or apparatus receives are signal values, those corresponding to determined line pieces could be extracted accordingly.

Step 850 is performed for calculating a sum of differences between signal values and corresponding baselines. In other words, an area representing an enclosure between signal values and baselines is the sum.

Next, step 860 is performed for determining whether the sum or the area is less than or equals to zero. Alternatively, it is used for determining whether the sum or the area is less than zero. If so, the flow goes to step 870. It is determined that the line piece is related to a mistaken approaching/touching event, which is probably caused by ghost point or water spot. In one instance, the 1D sensing information corresponding to the line piece may be discarded or ignored. There is no need for further calculation with regard to the mistaken event. If the result of step 860 is negative, the flow goes to step 880. The approaching/touching event corresponding to the line piece would be calculated.

Figure 9:
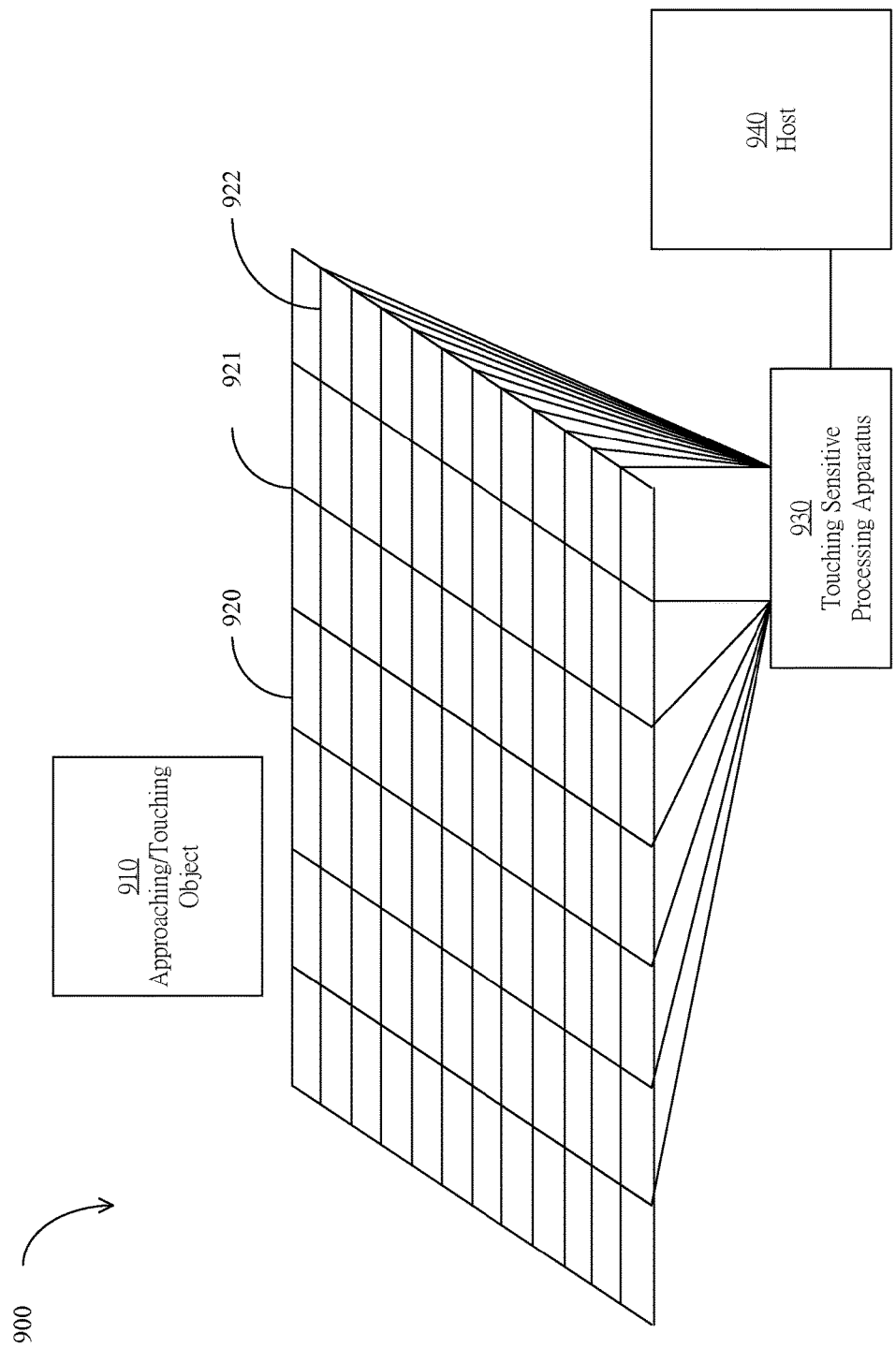
FIG. 9 depicts a diagram of a touch sensitive system in accordance with an embodiment of the present application.

Please refer to FIG. 9, which depicts a touch sensitive system 900 in accordance with an embodiment of the present invention. The system 900 comprises at least one approaching/touching object 910, a touch panel 920, a touch sensitive processing apparatus 930, and a host 940. In the embodiment, the touch panel 920 is formed on top of a substrate. The touch panel 920 may be a touch screen. The present invention does not limit forms of the touch panel 920.

In one embodiment, a touch sensitive area of the touch panel 920 comprises a plurality of first electrodes 921 and a plurality of second electrodes 922. Multiple sensing points are formed in the intersections of these two electrodes. The first electrodes 921 and the second electrodes 922 are connected to the touch sensitive processing apparatus 930. In a mutual capacitance detecting mode, the first electrodes 921 could be first conductive strips or driving electrodes, the second electrodes 922 could be second conductive strips or sensing electrodes. The touch sensitive processing apparatus 930 may provide driving voltage (voltage of driving signals) to those first electrodes 921 and measure signal variations on those second electrodes 922 to determine whether external conductive object approaches or touches the touch panel 920. People with ordinary skill in the art can understand that the touch sensitive processing apparatus 930 can detect approaching/touching object and event according to mutual capacitance or self-capacitance mechanisms. The principles of the mechanisms are not elaborated here.

FIG. 9 also shows the host 940 which may be a central processing unit executing operating system, a core processor of an embedded system, or any other form of computer. In one embodiment, the touch sensitive system 900 may be a tablet computer. The host 940 may be a CPU executing operating system of the tablet computer. For example, the tablet runs on Android OS and the host 940 is an ARM processor which executes Android OS. The present invention does not limit format or forms transmitted between the host 940 and the touch sensitive processing apparatus 930, as long as the transmitted information is related to approaching/touching event happened on the touch panel 920.

The touch sensitive processing apparatus 930 may be configured to execute the method and any variants shown in FIG. 8. The touch sensitive processing apparatus 930 may comprise memory or access memory which may store software, firmware, touch sensitive signal values, difference values, dual difference values, and/or any other computing results or intermediate values.

In summarized, the method and apparatus for determining mistaken approaching/touching event provided by the present invention can reduce or even prevent mistaken approaching/touching event is reported to the host and unwanted user command.

Figure 10A:
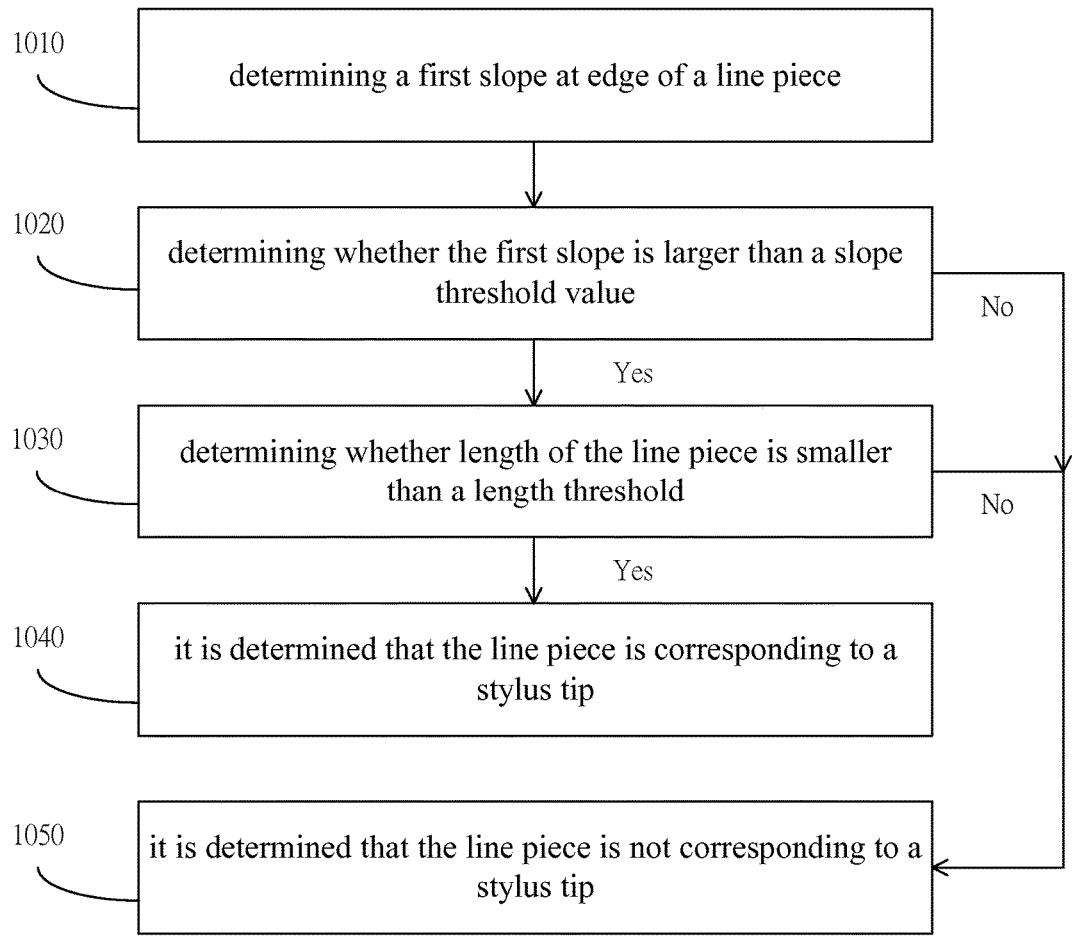
FIG. 10A-D depicts flowchart diagrams of determining whether a line piece corresponds to a stylus tip in accordance with an embodiment of the present application.

Please refer to FIG. 10A, which depicts a flowchart for determining whether a line piece corresponds to a stylus tip in accordance with an embodiment of the present invention. The touch sensitive processing apparatus 930 may be used to execute method flowchart and any variants shown in FIG. 10A. The touch sensitive processing apparatus 930 may comprise memory or access memory which may store software, firmware, touch sensitive signal values, difference values, dual difference values, and/or any other computing results or intermediate values. As shown in FIG. 10A, except for those consequential steps, the present invention does not limit the execution order of the steps. And additional step could be inserted into two steps. Besides, embodiments shown in FIGS. 5A, 5B, 5C, and 8 are incorporated into references.

In one embodiment, as shown in steps 810 through 840 of FIG. 8, touch sensitive signal values corresponding to at least one line piece are gathered. Next, step 1010 is executed for determining a first slope at edge of the line piece. The first slope may be slope of left edge of the line piece or right edge of the line piece. In one instance, assuming the first slope is the slope of left edge, it may look for a first relative high point from the most left of the line piece to right. Then the first slope in between the left edge to the first relative high point could be calculated accordingly. Alternatively, assuming the first slope is the slope of right edge, it may look for the first relative high point from the rightest of the line piece to left. Then the first slope in between the right edge to the first relative high point could be calculated accordingly. Besides, alternative slope calculating method may be used. For example, a slope of a certain range of the line piece edge may be taken as the first slope.

Once the first slope is calculated, step 1020 could be performed in consequence for determining whether the first slope is larger than a slope threshold value. If the result is negative, flow goes to step 1050. It is determined that the line piece is not corresponding to a stylus tip, or any other small area approaching/touching event caused by external conductive object. If the result is positive, flow may go to optional step 1030 or step 1040. It is determined that the line piece is corresponding to a stylus tip or any other small area approaching/touching event caused by external conductive object.

In optional step 1030, it is determined that whether length of the line piece is smaller than a length threshold. If the result is negative, it is determined that the line piece is not corresponding to a stylus tip or any other small area approaching/touching event caused by external conductive object. Otherwise, if the result is yes, flow goes to step 1040. It is determined that the line piece is corresponding to a stylus tip or any other small area approaching/touching event caused by external conductive object.

Figure 10B:
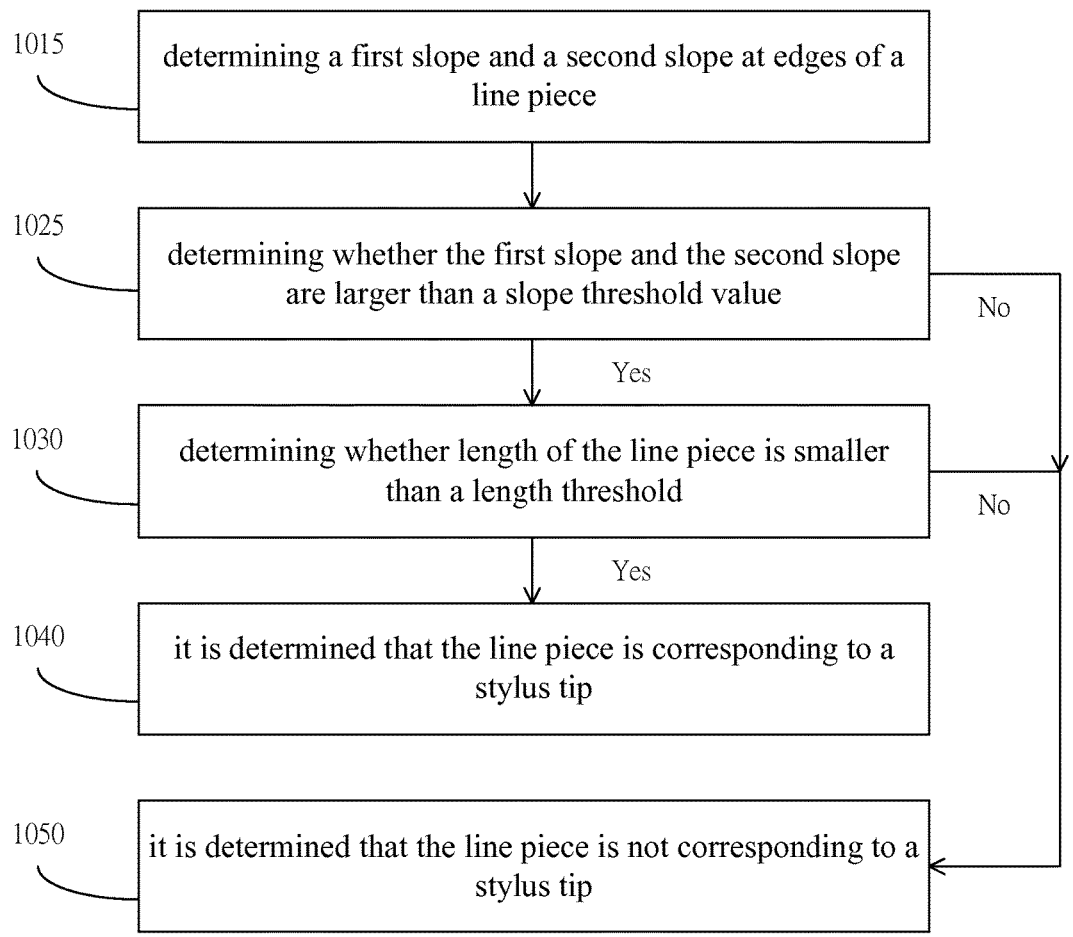

Please refer to FIG. 10B, which depicts a flowchart for determining whether a line piece corresponds to a stylus tip in accordance with an embodiment of the present invention. Comparing with embodiment shown in FIG. 10A, the embodiment shown in FIG. 10B reuses the steps 1040, 1040, and 1050. In the initial step 1015, a second slope is calculated in additional to calculating the first slope. If the first slope represents slope of the left edge of the line piece, the second slope represents slope of the right edge of the line piece. Otherwise, if the first slope represents slope of the right edge of the line piece, the second slope represents slope of the left edge of the line piece.

Next, in step 1025, it is determined whether both the first and the second slopes are larger than the slope threshold. If the result is no, it is determined that the line piece is not corresponding to a stylus tip or any other small area approaching/touching event caused by external conductive object. Otherwise, if the result is yes, flow may go to optional step 1030 or directly to step 1040. It is determined that the line piece is corresponding to a stylus tip or any other small area approaching/touching event caused by external conductive object.

Figure 10C:
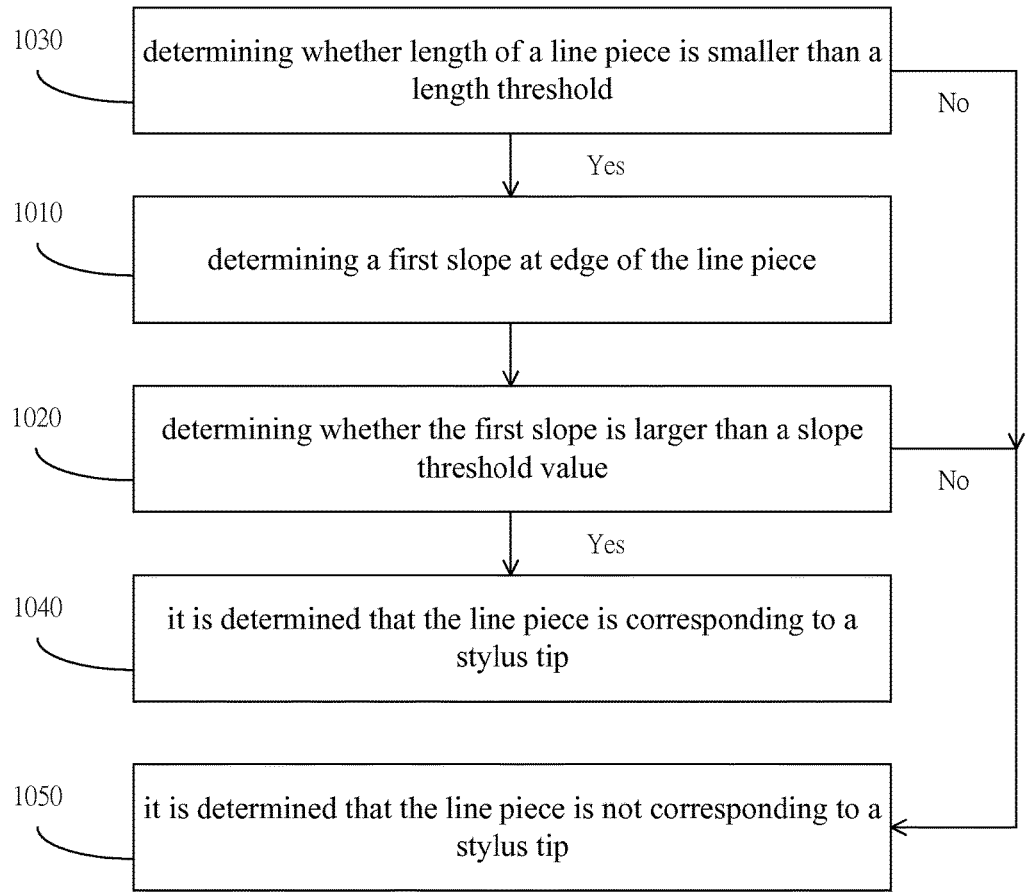

Please refer to FIG. 10C, which depicts a flowchart for determining whether a line piece corresponds to a stylus tip in accordance with an embodiment of the present invention. Comparing with embodiment shown in FIG. 10A, the embodiment shown in FIG. 10B reuses all of the steps but changes their execution sequence. Initially, step 1030 is performed. If the result is negative, flow goes to step 1050. Otherwise, if the result is positive, flow may go to optional step 1010 or step 1040. After the optional step 1010 is executed, step 1020 follows. If the result is negative, flow goes to step 1050. Otherwise, if the result is positive, flow goes to step 1040.

Figure 10D:
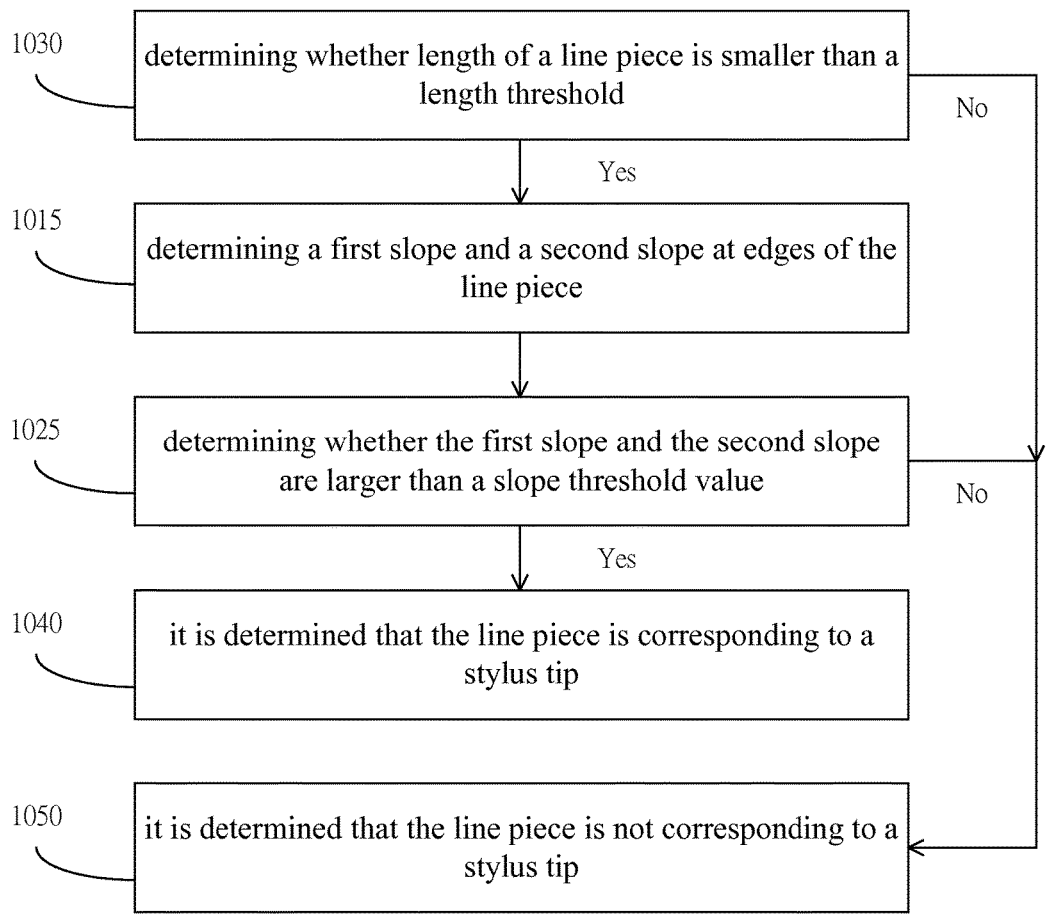

Please refer to FIG. 10D, which depicts a flowchart for determining whether a line piece corresponds to a stylus tip in accordance with an embodiment of the present invention. Comparing with embodiment shown in FIG. 10C, the embodiment shown in FIG. 10D substitutes the steps 1010 and 1020 with the steps 1015 and 1025, respectively. At the beginning, step 1030 is performed. If the result is negative, flow goes to 1050. Otherwise, if the result is positive, flow may go to optional step 1015 or step 1040. After the optional step 1015 is executed, step 1025 follows. If the result is negative, flow goes to step 1050. Otherwise, if the result is positive, flow goes to step 1040.

Figure 11A:
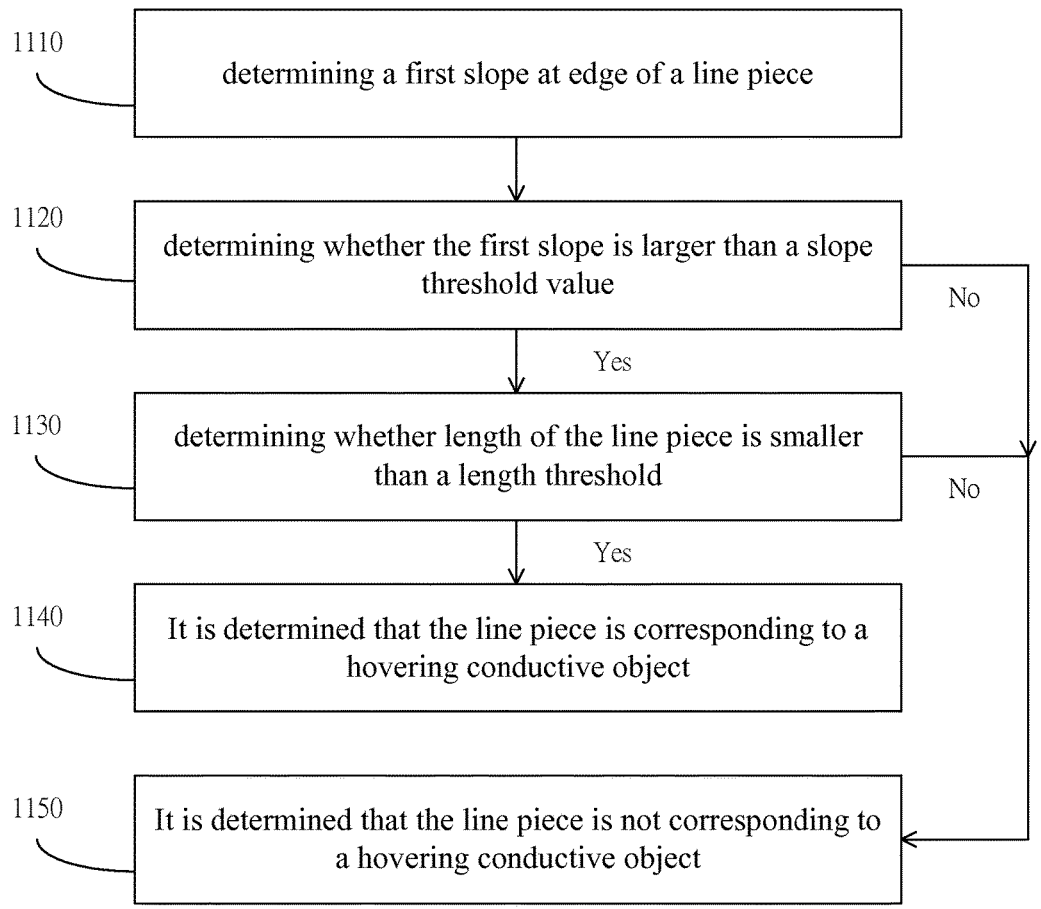
FIG. 11A-D depicts flowchart diagrams of determining whether a line piece corresponds to a hovering conductive object in accordance with an embodiment of the present application.

Please refer to FIG. 11A, which depicts a flowchart for determining whether a line piece corresponds to a hovering conductive object in accordance with an embodiment of the present invention. The touch sensitive processing apparatus 930 as shown in FIG. 9 may be used to execute method flowchart and any variants shown in FIG. 11A. The touch sensitive processing apparatus 930 may comprise memory or access memory which may store software, firmware, touch sensitive signal values, difference values, dual difference values, and/or any other computing results or intermediate values. As shown in FIG. 11A, except for those consequential steps, the present invention does not limit the execution order of the steps. And additional step could be inserted into two steps. Besides, embodiments shown in FIGS. 5A, 5B, 5C, 8, 10A, 10B, 10C, and 10D are incorporated into references.

In one embodiment, as shown in steps 810 through 840 of FIG. 8, touch sensitive signal values corresponding to at least one line piece are gathered. Next, step 1110 is executed for determining a first slope at edge of the line piece. The first slope may be slope of left edge of the line piece or right edge of the line piece. In one instance, assuming the first slope is the slope of left edge, it may look for a first relative high point from the most left of the line piece to right. Then the first slope in between the left edge to the first relative high point could be calculated accordingly. Alternatively, assuming the first slope is the slope of right edge, it may look for the first relative high point from the rightest of the line piece to left. Then the first slope in between the right edge to the first relative high point could be calculated accordingly. Besides, alternative slope calculating method may be used. For example, a slope of a certain range of the line piece edge may be taken as the first slope Once the first slope is calculated, flow continues to step 1120 for determining whether the first slope is smaller than a slope threshold. If the result is negative, flow goes to step 1150. It is determined that the line piece is not corresponding to a hovering conductive object. If the result is positive, flow may go to optional step 1130 or directly to step 1140. It is determined that the line piece is corresponding to a hovering conductive object.

In optional step 1130, it is configured for determining whether length of the line piece is smaller than a length threshold. If the result is negative, flow goes to step 1150. It is determined that the line piece is not corresponding to a hovering conductive object. If the result is positive, flow goes to step 1140. It is determined that the line piece is corresponding to a hovering conductive object.

Figure 11B:
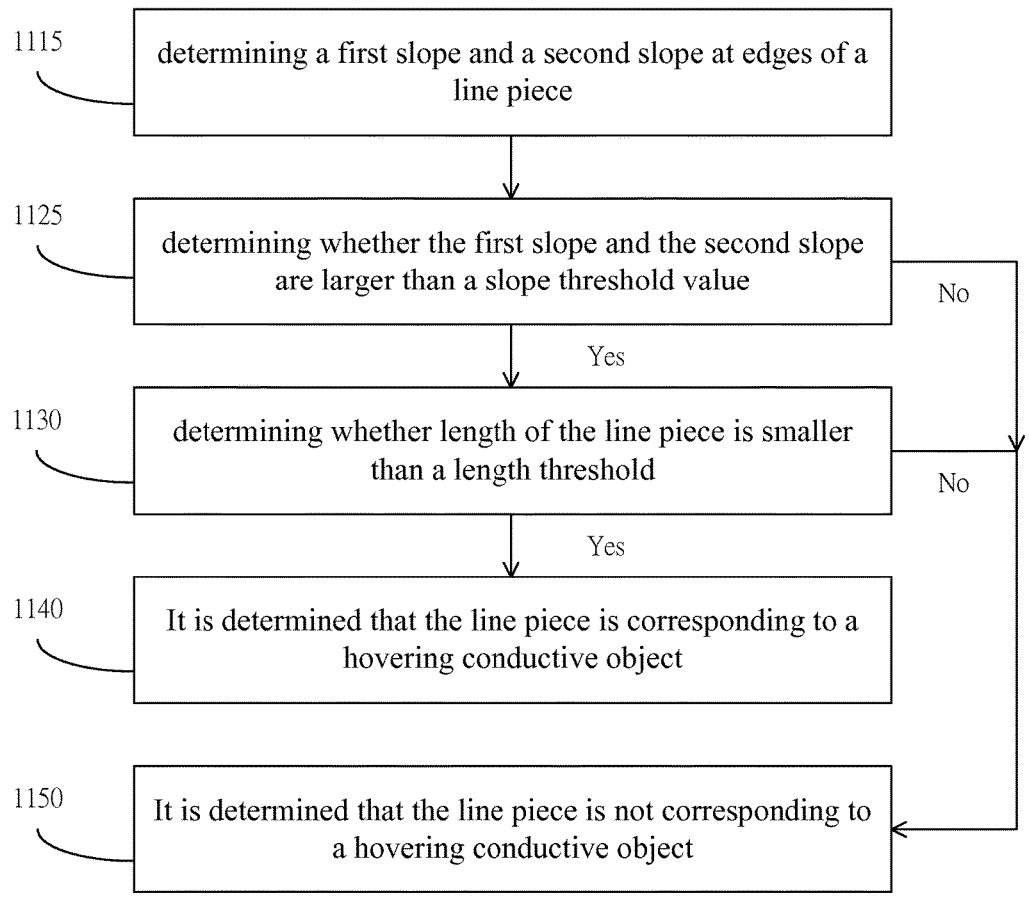

Please refer to FIG. 11B, which depicts a flowchart for determining whether a line piece corresponds to a hovering conductive object in accordance with an embodiment of the present invention. Comparing with embodiment shown in FIG. 11A, the embodiment shown in FIG. 11B reuses the steps 1130, 1140, and 1150. In initial step 1115, a second slope is calculated in additional to calculating a first slope. In other words, slopes at the left edge and the right edge of the line piece are calculated. If the first slope represents slope of the left edge of the line piece, the second slope represents slope of the right edge of the line piece. Otherwise, if the first slope represents slope of the right edge of the line piece, the second slope represents slope of the left edge of the line piece.

Next, in step 1125, it is configured for determining whether both the first slope and the second slope are larger than a slope threshold. If the result is negative, flow goes to step 1150. It is determined that the line piece is not corresponding to a hovering conductive object. If the result is positive, flow goes to optional step 1130 or directly to step 1140. It is determined that the line piece is corresponding to a hovering conductive object.

Figure 11C:
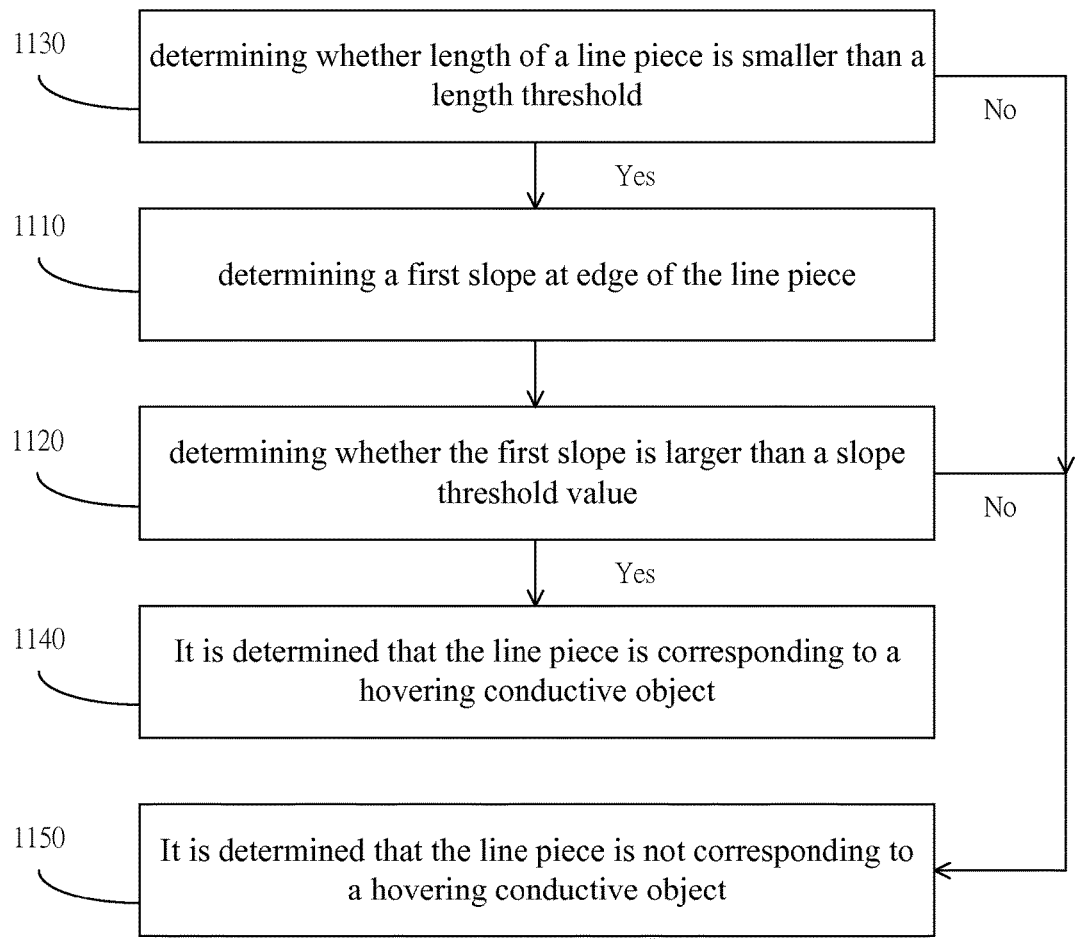

Please refer to FIG. 11C, which depicts a flowchart for determining whether a line piece corresponds to a hovering conductive object in accordance with an embodiment of the present invention. Comparing with embodiment shown in FIG. 11A, the embodiment shown in FIG. 11C reuses all of the steps but changes execution consequence. Initially, step 1130 is executed. If the result is negative, flow goes to step 1150. Otherwise, if the result is positive, flow goes to optional step 1110 or step 1140. After optional step 1110 is executed, step 1120 follows. If the result is negative, flow goes to step 1150. Otherwise, if the result is positive, flow goes to step 1140.

Figure 11D:
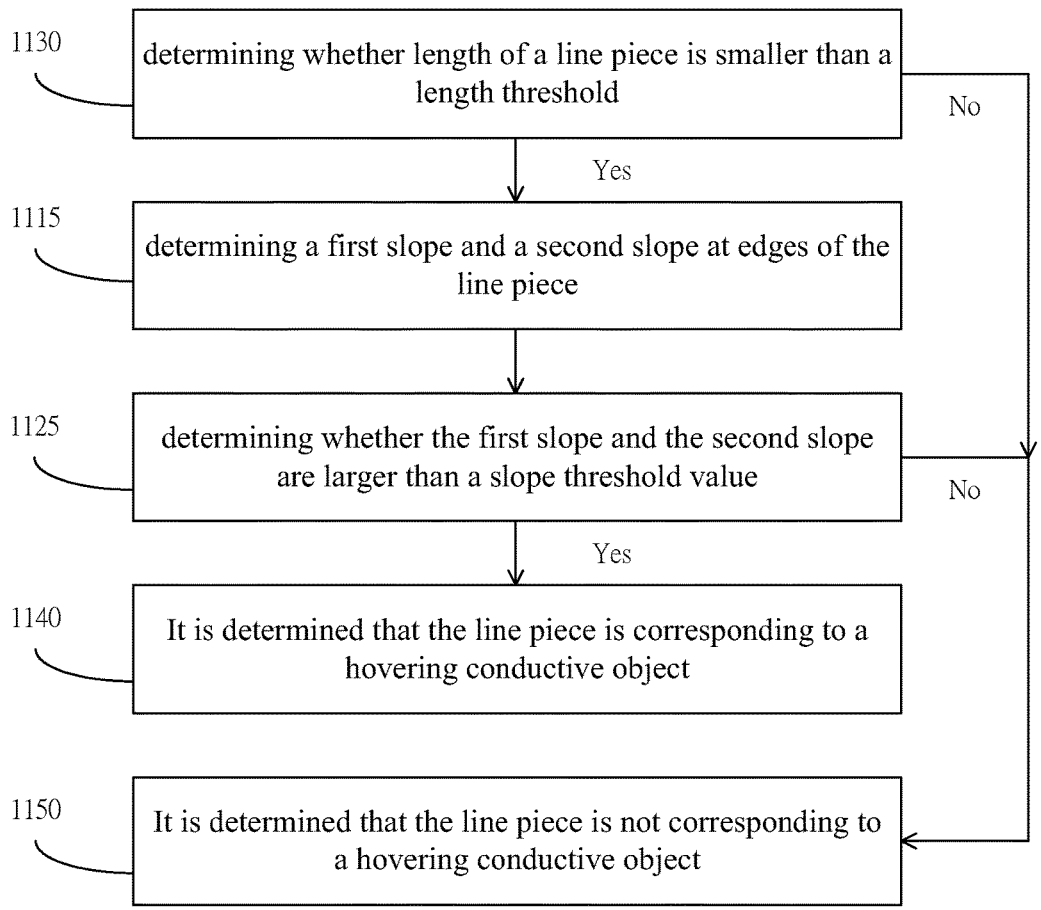

Please refer to FIG. 11D, which depicts a flowchart for determining whether a line piece corresponds to a hovering conductive object in accordance with an embodiment of the present invention. Comparing with embodiment shown in FIG. 11C, the embodiment shown in FIG. 11D substitutes the steps 1110 and 1120 with the steps 1115 and 1125, respectively. At the beginning, step 1130 is performed. If the result is negative, flow goes to optional 1150. Otherwise, if the result is positive, flow may go to optional step 1115 or step 1140. After the optional step 1115 is executed, step 1125 follows. If the result is negative, flow goes to step 1150. Otherwise, if the result is positive, flow goes to step 1140.

Figure 12:
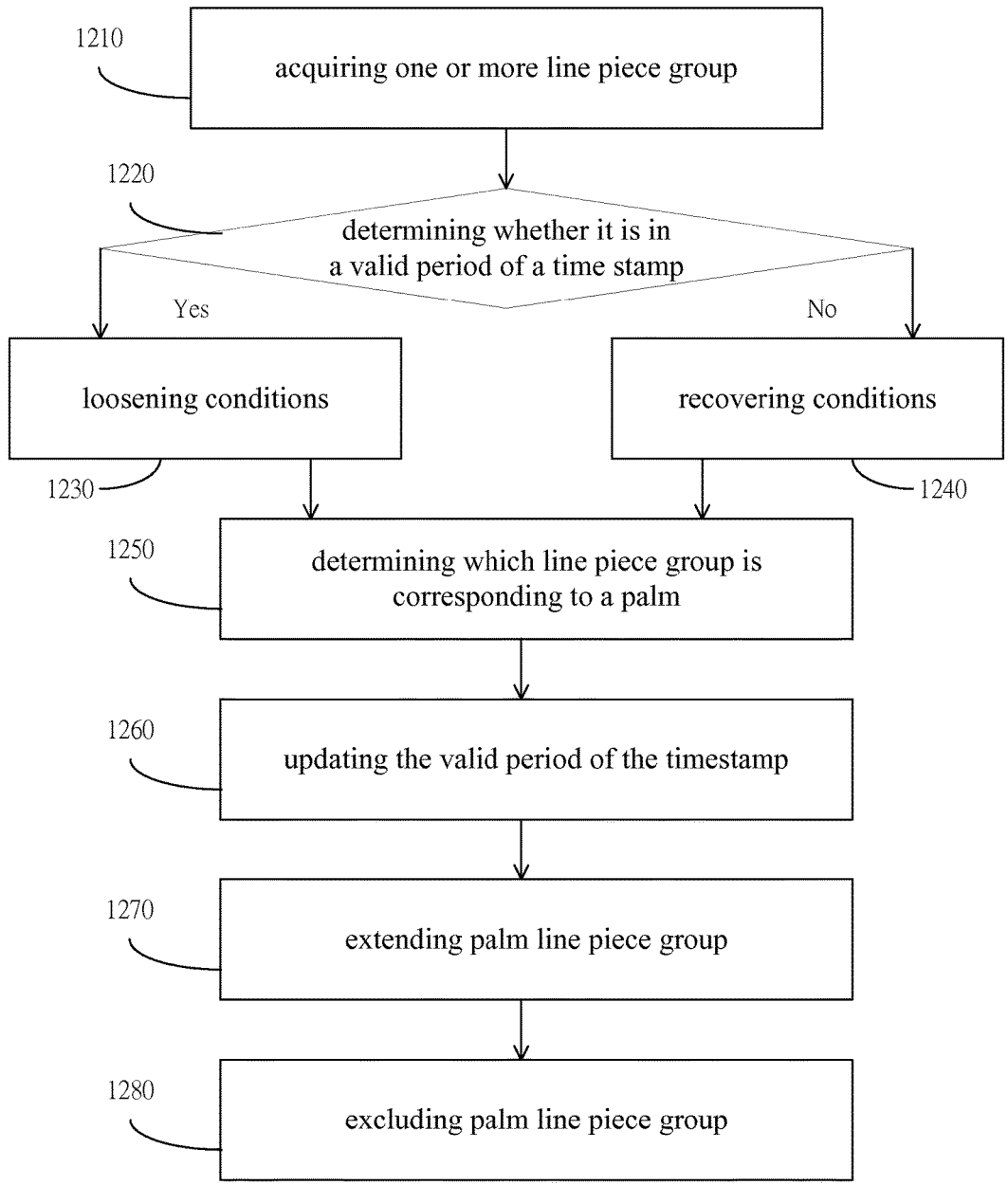
FIG. 12 depicts a flowchart diagram for excluding line piece corresponding to palm in accordance with an embodiment of the present invention.

Please refer to FIG. 12, which depicts a flowchart diagram for excluding line piece corresponding to palm in accordance with an embodiment of the present invention. The touch sensitive processing apparatus 930 as shown in FIG. 9 may be used to execute method flowchart and any variants shown in FIG. 12. The touch sensitive processing apparatus 930 may comprise memory or access memory which may store software, firmware, touch sensitive signal values, difference values, dual difference values, and/or any other computing results or intermediate values. As shown in FIG. 12, except for those consequential steps, the present invention does not limit the execution order of the steps. And additional step could be inserted into two steps. Besides, embodiments shown in FIGS. 6 and 8 are incorporated into references.

Before performing the embodiment as shown in FIG. 12, it may perform steps 810 through 830 of the embodiment as shown in FIG. 8. Next, in step 1210, it is supposed to form one or more line piece group by those determined line pieces. As shown in FIG. 6, if adjacent line pieces have neighboring sections or line pieces connects in vertical, these line pieces are configured to form a line piece group. After step 1210, flow may go to optional step 1220 or directly to step 1250.

In optional step 1220, it is configured for determining whether current time or time of retrieving the line piece group is in a valid period of a time stamp. In case no time stamp is set or the time is not in the valid period of the time stamp, flow may go to optional step 1240. Otherwise, assuming that the time is in the valid period of the time stamp, flow goes to optional step 1230.

Already mentioned above, it may use one or more conditions to determine whether a line piece group is corresponding to a palm. Indicated in the embodiment shown in FIG. 6, if a line piece group satisfies one or a combination of following conditions, it is determined that the line piece group is corresponding to a palm. Condition One: when a signal value of a line piece in a line piece group is higher than a palm signal threshold. Condition Two: when the length of a line piece in a line piece group is larger than a palm length threshold. Condition Three: when the number of line pieces in a line piece group is larger than a palm line piece quantity threshold. The palm length threshold may or may not be equal to the palm line piece quantity threshold.

In optional step 1230, loosening conditions; part or all of the thresholds, such as palm signal threshold, palm line piece quantity threshold, and palm length threshold, in these conditions may be reduced or lowered. As a result, in optional step 1240, recovering conditions; the reduced thresholds in step 1230 are recovered back to normal values. The present invention does not limit the situations of reduction and recovery.

Next, flow goes to step 1250 for determining which line piece group is corresponding to a palm according to threshold varied in step 1230 or step 1240 or constant threshold. Assuming that no line piece group is determined as a palm line piece group in step 1250, flow may stop. Otherwise, if one or more line piece group is determined as a palm line piece group, flow may go to optional step 1260 or directly to step 1270.

Like steps 1220, 1230, and 1240, step 1260 is optional, too. In this step, since one or more palm line piece group is found in step 1250, the valid period of the time stamp needs to be updated. If no time stamp is set, it may be created in step 1260. In case there is no time stamp set up in step 1210, flow may directly go to step 1250 from step 1210.

In step 1270, a procedure of extending palm line piece group is performed. With regard to each palm line piece group, one or more of the following steps may be performed. Step 1270 may comprise horizontal extension step, vertical extension step, and rectangular extension step.

The horizontal extension step is configured to extend each line piece in the line piece group forward and backward a fixed distance or a variable distance proportional to length of the line piece. If the line piece is longer, more distance is extended. Instead, if the line piece is shorter, less distance is extended.

The vertical extension step is configured to have one or more extension line pieces upward and downward of fringe line pieces. Length of these extended line pieces may be equal or in proportional to lengths of corresponding fringe line pieces. For example, length of the first extended line piece may be 80% of length of corresponding fringe line piece, length of the second extended line piece may be 80% of length of the first extended line piece, and so on, until number of extension line pieces hits a upper bound or length of a last extended line piece hits a lower bound.

Rectangular extension step is configured to find out an enlarged palm rectangle covering the whole palm line piece group. In one instance, edges of a palm rectangle include the top and the bottom line pieces as well as the most left and the rightest line pieces. Alternatively, the enlarged palm rectangle may cover the smallest palm rectangle.

Other line piece group covered by extended range is considered as a palm line piece group. In one embodiment, the extension is done once. It implies that there is no extension of the extended palm line piece group. In another embodiment, the extension may be performed more than once. It is said that extension of the extended palm line piece group is allowed. However, steps of the secondary extension may be as the same as steps of the first extension, or may be not.

At last, flow goes to step 1280 for excluding palm line piece group determined in step 1250 and extended palm line piece group step 1270.

Figure 13:
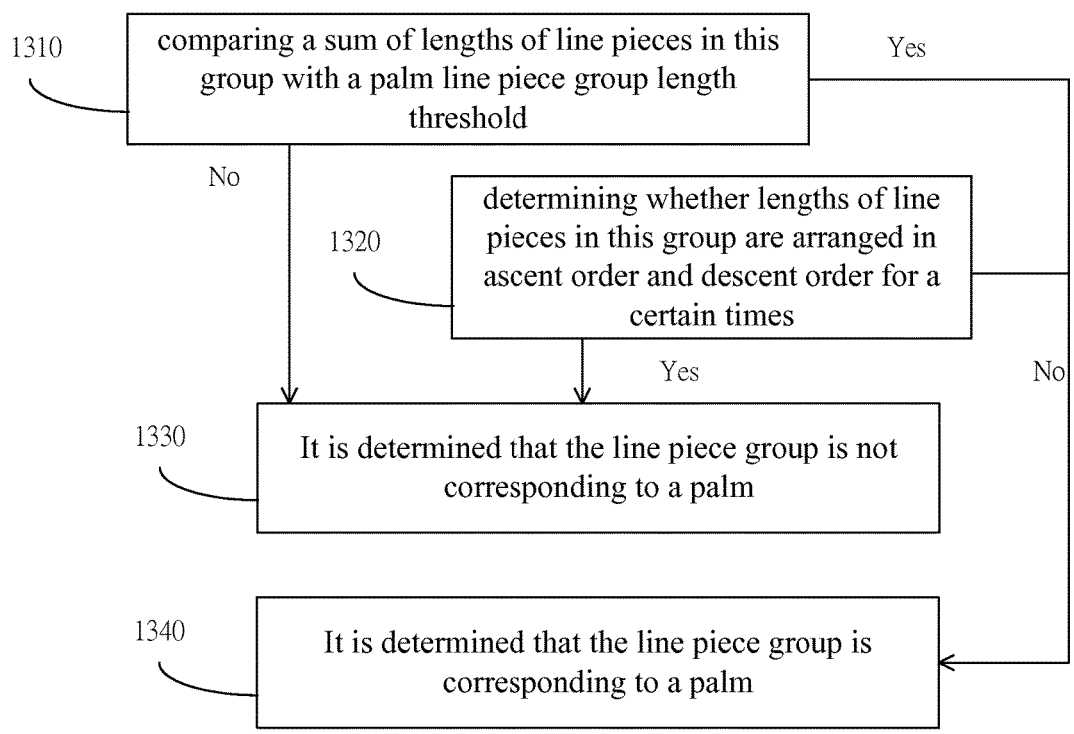
FIG. 13 depicts a flowchart diagram for determining a palm line piece group in accordance with an embodiment of the present invention.

Please refer to FIG. 13, which depicts a flowchart diagram for determining a palm line piece group in accordance with an embodiment of the present invention. The touch sensitive processing apparatus 930 as shown in FIG. 9 may be used to execute method flowchart and any variants shown in FIG. 13. The touch sensitive processing apparatus 930 may comprise memory or access memory which may store software, firmware, touch sensitive signal values, difference values, dual difference values, and/or any other computing results or intermediate values. As shown in FIG. 13, except for those consequential steps, the present invention does not limit the execution order of the steps. And additional step could be inserted into two steps. Besides, embodiments shown in FIGS. 7 and 12 are incorporated into references.

In one embodiment, the flowchart shown in FIG. 13 may be applied in step 1250 shown in FIG. 12. After one or more palm line piece group is determined in step 1250, the embodiment shown in FIG. 13 could be further used to validate the palm line piece group. However, the present invention does not limit that the embodiment shown in FIG. 13 has to be applied to the embodiment shown in FIG. 12.

In response to a line piece group is determined as a palm line piece group, flow initially goes to step 1310 for comparing a sum of lengths of line pieces in this group with a palm line piece group length threshold. If the sum is larger, the flow may go to step 1340. It is determined that the line piece group is corresponding to a palm. Otherwise, flow may go to step 1330. It is determined that the line piece group is not corresponding to a palm.

Alternatively, if the sum is larger than the palm line piece group length threshold, flow may go to step 1320 for determining whether lengths of line pieces in this group are arranged in ascent order and descent order for a certain times. In case they are arranged so in a certain times, flow may goes to step 1330. It is determined that the line piece group is not corresponding to a palm. Otherwise, flow goes to step 1340, it is confirmed that the line piece group is corresponding to a palm.

In another embodiment, in case a line piece group is taken as a palm line piece group, flow initially goes to step 1320 for determining whether lengths of line pieces in this group are arranged in ascent order and descent order for a certain times. In case they are arranged so in a certain times, flow may goes to step 1330. It is determined that the line piece group is not corresponding to a palm. Otherwise, flow goes to step 1340, it is confirmed that the line piece group is corresponding to a palm.

In other embodiment, if lengths of line pieces in this group are arranged in ascent order and descent order for a certain times, flow may goes to step 1310. If it is determined that the sum is larger than the palm line piece group length threshold, flow may go to step 1340. It is confirmed that the line piece group is corresponding to a palm. Otherwise, flow goes to step 1330. It is determined that the line piece group is not corresponding to a palm.

In summarized, step 1310 and/or step 1320 may be used for determining whether a palm line piece group is corresponding to a palm. In case that the line piece group is not corresponding to a palm, the following procedures may be used to break the line piece group into multiple groups. For example, relative low points of signal values along a central profile of the line piece group could be used to divide the group. Besides, line pieces with lengths shorter than a length threshold may be used to divide the line piece group. Furthermore, line pieces shorter than neighboring line pieces may be used to divide the line piece group. In case two neighboring line pieces have the same length and shorter than other neighboring line pieces, these two line pieces could be separated into two line piece groups.

It is worth noted that if a line piece group is separated into multiple groups, these groups would not be affected by step 1270 shown in FIG. 12. In other words, even these groups are covered by extended palm line piece group; they would not be joined into the palm line piece group.

One objective of the present application is to provide a method for determining mistaken approaching/touching event, comprising: gathering one or more touch sensitive signal value corresponding to a line piece; calculating a sum of differences of each signal value and a baseline value; and if the sum is less than or equals to zero, determining the line piece is corresponding to a mistaken approaching/touching event.

One objective of the present application is to provide an apparatus for determining mistaken approaching/touching event. The apparatus is configured to perform the following steps: gathering one or more touch sensitive signal value corresponding to a line piece; calculating a sum of differences of each signal value and a baseline value; and if the sum is less than or equals to zero, determining the line piece is corresponding to a mistaken approaching/touching event.

In one embodiment, the method further comprises calculating the line piece according to 1D sensing information having dual difference values. Alternatively, the method further comprises calculating 1D sensing information having dual difference values according to 1D sensing information having difference values. Alternatively, the method further comprises calculating 1D sensing information having difference values according to 1D sensing information having signal values.

In one embodiment, if the sum is larger than zero, calculating the approaching/touching event corresponding to the line piece.

One objective of the present application is to provide a method for determining whether a line piece is corresponding to a stylus tip, comprising: gathering multiple touch sensitive signal values corresponding to a line piece; calculating a first slope at edge of the line piece; determining whether the first slope is larger than a slope threshold; and determining that the line piece is corresponding to the stylus tip if the first slope is larger than the slope threshold.

One objective of the present application is to provide an apparatus for determining whether a line piece is corresponding to a stylus tip. The apparatus is configured to perform the following steps: gathering multiple touch sensitive signal values corresponding to a line piece; calculating a first slope at edge of the line piece; determining whether the first slope is larger than a slope threshold; and determining that the line piece is corresponding to the stylus tip if the first slope is larger than the slope threshold.

In one embodiment, the method further comprises determining whether length of the line piece is larger than a length threshold if the first slope is larger than the slope threshold; and determining that the line piece is corresponding to the stylus tip if length of the line piece is less than the length threshold.

One objective of the present application is to provide a method for determining whether a line piece is corresponding to a stylus tip, comprising: gathering multiple touch sensitive signal values corresponding to a line piece; calculating a first slope and a second slopes at edges of the line piece; determining whether the first slope and the second slope are larger than a slope threshold; and determining that the line piece is corresponding to the stylus tip if the first slope and the second slope are larger than the slope threshold.

One objective of the present application is to provide an apparatus for determining whether a line piece is corresponding to a stylus tip. The apparatus is configured to perform the following steps: gathering multiple touch sensitive signal values corresponding to a line piece; calculating a first slope and a second slopes at edges of the line piece; determining whether the first slope and the second slope are larger than a slope threshold; and determining that the line piece is corresponding to the stylus tip if the first slope and the second slope are larger than the slope threshold.

In one embodiment, the method further comprises determining whether length of the line piece is larger than a length threshold if the first slope and the second slope are larger than the slope threshold; and determining that the line piece is corresponding to the stylus tip if length of the line piece is less than the length threshold.

One objective of the present application is to provide a method for determining whether a line piece is corresponding to a stylus tip, comprising: determining length of the line piece is less than a length threshold; and determining that the line piece is corresponding to the stylus tip if length of the line piece is less than the length threshold.

One objective of the present application is to provide an apparatus for determining whether a line piece is corresponding to a stylus tip. The apparatus is configured to perform the following steps: determining length of the line piece is less than a length threshold; and determining that the line piece is corresponding to the stylus tip if length of the line piece is less than the length threshold.

In one embodiment, if length of the line piece is less than the length threshold, the method further comprises: gathering multiple touch sensitive signal values corresponding to a line piece; calculating a first slope at edge of the line piece; determining whether the first slope is larger than a slope threshold; and determining that the line piece is corresponding to the stylus tip if the first slope is larger than the slope threshold.

In one embodiment, if length of the line piece is less than the length threshold, the method further comprises: gathering multiple touch sensitive signal values corresponding to a line piece; calculating a first slope and a second slopes at edges of the line piece; determining whether the first slope and the second slope are larger than a slope threshold; and determining that the line piece is corresponding to the stylus tip if the first slope and the second slope are larger than the slope threshold.

One objective of the present application is to provide a method for determining whether a line piece is corresponding to a hovering conductive object, comprising: gathering multiple touch sensitive signal values corresponding to a line piece; calculating a first slope at edge of the line piece; determining whether the first slope is less than a slope threshold; and determining that the line piece is corresponding to the hovering conductive object if the first slope is less than the slope threshold.

One objective of the present application is to provide an apparatus for determining whether a line piece is corresponding to a hovering conductive object. The apparatus is configured to perform the following steps: gathering multiple touch sensitive signal values corresponding to a line piece; calculating a first slope at edge of the line piece; determining whether the first slope is less than a slope threshold; and determining that the line piece is corresponding to the hovering conductive object if the first slope is less than the slope threshold.

In one embodiment, the method further comprises determining whether length of the line piece is less than a length threshold if the first slope is less than the slope threshold; and determining that the line piece is corresponding to the hovering conductive object if length of the line piece is less than the length threshold.

One objective of the present application is to provide a method for determining whether a line piece is corresponding to a hovering conductive object, comprising: gathering multiple touch sensitive signal values corresponding to a line piece; calculating a first slope and a second slope at edges of the line piece; determining whether the first slope and the second slope are less than a slope threshold; and determining that the line piece is corresponding to the hovering conductive object if the first slope and the second slope are less than the slope threshold.

One objective of the present application is to provide an apparatus for determining whether a line piece is corresponding to a hovering conductive object. The apparatus is configured to perform the following steps: gathering multiple touch sensitive signal values corresponding to a line piece; calculating a first slope and a second slope at edges of the line piece; determining whether the first slope and the second slope are less than a slope threshold; and determining that the line piece is corresponding to the hovering conductive object if the first slope and the second slope are less than the slope threshold.

In one embodiment, the method further comprises determining whether length of the line piece is less than a length threshold if the first slope and the second slope are less than the slope threshold; and determining that the line piece is corresponding to the hovering conductive object if length of the line piece is less than the length threshold.

One objective of the present application is to provide a method for determining whether a line piece is corresponding to a hovering conductive object, comprising: determining whether length of the line piece is less than a length threshold; and determining that the line piece is corresponding to the hovering conductive object if length of the line piece is less than the length threshold.

One objective of the present application is to provide an apparatus for determining whether a line piece is corresponding to a hovering conductive object. The apparatus is configured to perform the following steps: determining whether length of the line piece is less than a length threshold; and determining that the line piece is corresponding to the hovering conductive object if length of the line piece is less than the length threshold.

In one embodiment, if length of the line piece is less than the length threshold, the method further comprises: gathering multiple touch sensitive signal values corresponding to a line piece; calculating a first slope at edge of the line piece; determining whether the first slope is less than a slope threshold; and determining that the line piece is corresponding to the stylus tip if the first slope is less than the slope threshold.

In one embodiment, if length of the line piece is less than the length threshold, the method further comprises: gathering multiple touch sensitive signal values corresponding to a line piece; calculating a first slope and a second slopes at edges of the line piece; determining whether the first slope and the second slope are less than a slope threshold; and determining that the line piece is corresponding to the stylus tip if the first slope and the second slope are less than the slope threshold.

One objective of the present application is to provide an apparatus for excluding a line piece group corresponding to a palm, comprising: gathering multiple line piece groups; determining whether one or more palm line piece groups exist among the multiple line piece groups; extending the one or more palm line piece groups; and excluding the extended palm line piece group.

One objective of the present application is to provide an apparatus for excluding a line piece group corresponding to a palm. The apparatus is configured to perform the following steps: gathering multiple line piece groups; determining whether one or more palm line piece groups exist among the multiple line piece groups; extending the one or more palm line piece groups; and excluding the extended palm line piece group.

In one embodiment, the method further comprises: determining whether the time of acquiring the multiple line piece groups is in a valid period of a time stamp; loosening condition for determining the palm line piece group if the time is determined in the valid period of the time stamp; recovering condition for determining the palm line piece group if the time is not determined in the valid period of the time stamp. Alternatively, the method further comprises updating the valid period of the time stamp if the palm line piece group exists.

In one embodiment, the step of determining whether one or more palm line piece groups exist among the multiple line piece groups further comprises: taking a line piece group is a palm line piece group if a signal value of a line piece of the line piece group is larger than a palm signal threshold.

In one embodiment, the step of determining whether one or more palm line piece groups exist among the multiple line piece groups further comprises: taking a line piece group is a palm line piece group if length of a line piece of the line piece group is larger than a palm length threshold.

In one embodiment, the step of determining whether one or more palm line piece groups exist among the multiple line piece groups further comprises: taking a line piece group is a palm line piece group if quantity of line pieces of the line piece group is larger than a palm line piece quantity threshold.

In one embodiment, the step of loosening condition for determining the palm line piece group comprises reducing one or any combination of the following thresholds: a palm signal threshold; a palm length threshold; and a palm line piece quantity threshold. Alternatively, the step of recovering condition for determining the palm line piece group comprises recovering one or any combination of the following thresholds: a palm signal threshold; a palm length threshold; and a palm line piece quantity threshold.

In one embodiment, the step of extending the one or more palm line piece groups further comprises one or any combination of the following steps: a horizontal extension step; a vertical extension step; and a rectangular extension step.

In one embodiment, the horizontal extension step is configured to extend each line piece in the line piece group forward and backward a fixed distance or a variable distance. Alternatively, the variable distance is proportional to length of the line piece.

In one embodiment, the vertical extension step is configured to have one or more extension line pieces upward and downward of fringe line pieces, length of these extended line pieces may be equal or in proportional to lengths of corresponding fringe line pieces. Alternatively, length of extension line piece is proportional to length of corresponding fringe line piece and number of extension line pieces.

In one embodiment, the rectangular extension step is configured to find out an enlarged palm rectangle covering the whole palm line piece group. Alternatively, the enlarged palm rectangle covers a smallest palm rectangle.

In one embodiment, the method further comprises determining whether the palm line piece group needs to be divided before extending the palm line piece group. Alternatively, the step of determining whether the palm line piece group needs to be divided comprises one or any combination of the following conditions: determining whether a length sum of line pieces of the line piece group is larger than a palm line piece group length threshold; and determining whether lengths of line pieces in the line piece group are arranged in ascent order and descent order for a certain times.

In one embodiment, the method further comprises searching for relative low points of signal values along a central profile of the line piece group; and dividing the line piece group by the relative low points if it is determined that the palm line piece group needs to be divided. In one embodiment, the method further comprises searching for line pieces with lengths shorter than a length threshold; and dividing the line piece group by the line pieces with lengths shorter than the length threshold if it is determined that the palm line piece group needs to be divided. In one embodiment, the method further comprises searching for line pieces shorter than neighboring line pieces; and dividing the line piece group by the line pieces shorter than neighboring line pieces if it is determined that the palm line piece group needs to be divided. Alternatively, the method further comprises searching for two neighboring line pieces having the same length and shorter than other neighboring line pieces; and dividing the line piece group by the line pieces having the same length if it is determined that the palm line piece group needs to be divided.

In one embodiment, if a line piece group is divided into multiple second line piece groups, the second line piece groups are not part of the extended palm line piece group.

One objective of the present application is to provide a method for determining whether a palm line piece group needs to be divided, comprising one or any combination of the following steps: determining whether a length sum of line pieces of the line piece group is larger than a palm line piece group length threshold; and determining whether lengths of line pieces in the line piece group are arranged in ascent order and descent order for a certain times.

One objective of the present application is to provide an apparatus for determining whether a palm line piece group needs to be divided. The apparatus is configured to perform one or any combination of the following steps: determining whether a length sum of line pieces of the line piece group is larger than a palm line piece group length threshold; and determining whether lengths of line pieces in the line piece group are arranged in ascent order and descent order for a certain times.

In one embodiment, the method further comprises searching for relative low points of signal values along a central profile of the line piece group; and dividing the line piece group by the relative low points if it is determined that the palm line piece group needs to be divided. In one embodiment, the method further comprises searching for line pieces with lengths shorter than a length threshold; and dividing the line piece group by the line pieces with lengths shorter than the length threshold if it is determined that the palm line piece group needs to be divided. In one embodiment, the method further comprises searching for line pieces shorter than neighboring line pieces; and dividing the line piece group by the line pieces shorter than neighboring line pieces if it is determined that the palm line piece group needs to be divided. Alternatively, the method further comprises searching for two neighboring line pieces having the same length and shorter than other neighboring line pieces; and dividing the line piece group by the line pieces having the same length if it is determined that the palm line piece group needs to be divided.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A method for determining mistaken approaching/touching event, comprising: gathering one or more touch sensitive signal value corresponding to a line piece; calculating a sum of differences of each signal value and a baseline value; and determining the line piece is corresponding to a mistaken approaching/touching event if the sum is less than or equals to zero;

wherein the method further comprises calculating the line piece according to 1D sensing information having dual difference values.

2. The method of claim 1, further comprises calculating 1D sensing information having dual difference values according to 1D sensing information having difference values.

3. The method of claim 2, further comprises calculating 1D sensing information having difference values according to 1D sensing information having signal values.

4. The method of claim 1, further comprises calculating the mistaken approaching/touching event corresponding to the line piece when the sum is larger than zero.

5. An apparatus for determining mistaken approaching/touching event, the apparatus is configured to perform the following steps: gathering one or more touch sensitive signal value corresponding to a line piece; calculating a sum of differences of each signal value and a baseline value; and determining the line piece is corresponding to a mistaken approaching/touching event if the sum is less than or equals to zero;

wherein the method further comprises calculating the line piece according to 1D sensing information having dual difference values.

6. The apparatus of claim 5, further configured for calculating 1D sensing information having dual difference values according to 1D sensing information having difference values.

7. The apparatus of claim 6, further configured for calculating 1D sensing information having difference values according to 1D sensing information having signal values.

8. The apparatus of claim 5, further configured for calculating the mistaken approaching/touching event corresponding to the line piece when the sum is larger than zero.

* * * * *